US008411298B2

(12) United States Patent
Fertlitsch et al.

(10) Patent No.: US 8,411,298 B2
(45) Date of Patent: Apr. 2, 2013

(54) METHODS AND SYSTEMS FOR PRINTING DEVICE LOAD-BALANCING

(75) Inventors: Andrew Fertlitsch, Tigard, OR (US); Mary Louise Bourret, Portland, OR (US); Jerry Steven Orleck, Portland, OR (US)

(73) Assignee: Sharp Laboratories of America, Inc., Camas, WA (US)

( * ) Notice: Subject to any disclaimer, the term of this patent is extended or adjusted under 35 U.S.C. 154(b) by 975 days.

(21) Appl. No.: 09/964,985

(22) Filed: Sep. 26, 2001

(65) Prior Publication Data

US 2002/0089691 A1 Jul. 11, 2002

Related U.S. Application Data

(63) Continuation-in-part of application No. 09/894,928, filed on Jun. 28, 2011, now Pat. No. 7,480,068, which is a continuation-in-part of application No. 09/681,409, filed on Mar. 30, 2001, now abandoned, and a continuation-in-part of application No.

(Continued)

(51) Int. Cl.
*G06F 3/12* (2006.01)
(52) U.S. Cl. ........ 358/1.15; 358/1.9; 358/1.13; 358/1.16
(58) Field of Classification Search .................. 358/1.15
See application file for complete search history.

(56) References Cited

U.S. PATENT DOCUMENTS

| | | | | |
|---|---|---|---|---|
| 5,128,878 | A * | 7/1992 | Gore et al. | 345/502 |
| 5,241,397 | A | 8/1993 | Yamada | 358/296 |
| 5,287,194 | A * | 2/1994 | Lobiondo | 358/296 |
| 5,467,434 | A | 11/1995 | Hower et al. | |
| 5,528,734 | A | 6/1996 | Sanchez | 395/115 |
| 5,547,178 | A | 8/1996 | Costello | |
| 5,550,954 | A | 8/1996 | Campbell et al. | 395/106 |
| 5,630,062 | A | 5/1997 | Okutsu | |
| 5,697,040 | A | 12/1997 | Rabjohns et al. | |
| 5,699,495 | A | 12/1997 | Snipp | |
| 5,822,500 | A | 10/1998 | Utsunomiya et al. | |
| 5,845,058 | A | 12/1998 | Shaw et al. | 395/114 |
| 5,859,711 | A | 1/1999 | Barry et al. | 358/296 |
| 5,867,706 | A | 2/1999 | Martin et al. | 395/675 |
| 5,897,260 | A | 4/1999 | Zingher | 400/719 |
| 5,918,988 | A | 7/1999 | Van Oijen | |
| 5,940,186 | A * | 8/1999 | Barry et al. | 358/296 |
| 5,960,168 | A | 9/1999 | Shaw et al. | |

(Continued)

FOREIGN PATENT DOCUMENTS

| | | |
|---|---|---|
| EP | 0738949 | 12/1996 |
| JP | 64-014043 | 1/1989 |

(Continued)

OTHER PUBLICATIONS

U.S. Appl. No. 09/681,208—Office Action dated Jul. 19, 2007.

(Continued)

*Primary Examiner* — Benjamin O Dulaney
(74) *Attorney, Agent, or Firm* — Krieger Intellectual Property, Inc.; Scott C. Krieger

(57) ABSTRACT

Embodiments of the present invention comprise systems and methods for providing load-balancing in cluster printing environments. Embodiments may operate in conjunction with journalled print files, pre-processed, printer-ready print files and other file types. Some embodiments provide load-balanced cluster printing through a printer-independent, driver-independent print system component.

13 Claims, 16 Drawing Sheets

Related U.S. Application Data

09/681,416, filed on Mar. 30, 2001, now Pat. No. 7,406,384, which is a continuation-in-part of application No. 09/681,208, filed on Feb. 22, 2001, now abandoned.

(60) Provisional application No. 60/261,132, filed on Jan. 11, 2001.

(56) References Cited

U.S. PATENT DOCUMENTS

| | | | | |
|---|---|---|---|---|
| 5,978,560 | A | 11/1999 | Tan et al. | 395/114 |
| 5,978,650 | A | 11/1999 | Fischer et al. | 455/3.1 |
| 5,982,996 | A * | 11/1999 | Snyders | 358/1.15 |
| 5,995,721 | A | 11/1999 | Rourke et al. | 395/114 |
| 5,995,723 | A | 11/1999 | Sperry et al. | 395/114 |
| 6,049,394 | A * | 4/2000 | Fukushima | 358/1.9 |
| 6,055,063 | A | 4/2000 | Yang et al. | |
| 6,057,930 | A | 5/2000 | Blossey et al. | |
| 6,078,960 | A | 6/2000 | Ballard | 709/229 |
| 6,088,120 | A | 7/2000 | Shibusawa et al. | 358/1.15 |
| 6,101,508 | A | 8/2000 | Wolff | 707/218 |
| 6,118,546 | A | 9/2000 | Sanchez et al. | |
| 6,148,346 | A | 11/2000 | Hanson | |
| 6,157,465 | A | 12/2000 | Suda et al. | 358/407 |
| 6,172,765 | B1 | 1/2001 | Kawamoto | |
| 6,173,295 | B1 | 1/2001 | Goertz et al. | |
| 9,219,151 | | 4/2001 | Manglapus et al. | |
| 6,229,622 | B1 | 5/2001 | Takeda | 358/1.16 |
| 6,248,996 | B1 | 6/2001 | Johnson et al. | 250/234 |
| RE37,258 | E | 7/2001 | Patel et al. | 358/1.15 |
| 6,266,150 | B1 | 7/2001 | Brossman et al. | 358/1.15 |
| 6,320,667 | B1 | 11/2001 | Mitsuhashi | |
| 6,337,745 | B1 | 1/2002 | Aiello, Jr. et al. | 358/1.15 |
| 6,348,971 | B2 | 2/2002 | Owa et al. | |
| 6,348,972 | B1 | 2/2002 | Taniguchi et al. | |
| 6,397,245 | B1 | 5/2002 | Johnson et al. | |
| 6,452,692 | B1 | 9/2002 | Yacoub | |
| 6,474,881 | B1 | 11/2002 | Wanda | |
| 6,476,927 | B1 | 11/2002 | Schwarz, Jr. | |
| 6,509,974 | B1 | 1/2003 | Hansen | |
| 6,529,286 | B1 | 3/2003 | King | |
| 6,552,813 | B2 | 4/2003 | Yacoub | |
| 6,570,669 | B1 | 5/2003 | Onuma | |
| 6,580,521 | B1 | 6/2003 | Nishikawa et al. | |
| 6,584,503 | B1 | 6/2003 | Carney et al. | |
| 6,609,210 | B1 * | 8/2003 | Onuma | 713/323 |
| 6,618,167 | B1 | 9/2003 | Shah | |
| 6,624,909 | B1 * | 9/2003 | Czyszczewski et al. | 358/1.17 |
| 6,654,509 | B2 | 11/2003 | Nishikawa et al. | |
| 6,661,531 | B1 | 12/2003 | Murphy et al. | |
| 6,665,082 | B1 * | 12/2003 | Takeoka et al. | 358/1.15 |
| 6,697,165 | B2 | 2/2004 | Wakai et al. | |
| 6,700,678 | B1 | 3/2004 | Luman | |
| 6,707,568 | B1 | 3/2004 | Yu | |
| 6,724,494 | B1 | 4/2004 | Danknick | |
| 6,748,471 | B1 | 6/2004 | Keeney et al. | |
| 6,757,071 | B1 | 6/2004 | Goodman et al. | |
| 6,816,270 | B1 | 11/2004 | Cooper et al. | |
| 6,825,943 | B1 | 11/2004 | Barry et al. | |
| 6,863,367 | B2 * | 3/2005 | Hamamoto et al. | 347/23 |
| 6,891,632 | B2 * | 5/2005 | Schwartz | 358/1.15 |
| 6,914,693 | B1 * | 7/2005 | Kirkeby | 358/1.15 |
| 6,956,664 | B1 | 10/2005 | Kutty | |
| 6,965,958 | B1 | 11/2005 | Sugiyama | |
| 6,985,245 | B1 * | 1/2006 | Takahashi | 358/1.15 |
| 7,027,169 | B1 * | 4/2006 | Morikawa et al. | 358/1.14 |
| 7,031,014 | B2 | 4/2006 | Ohwa | |
| 7,046,384 | B2 | 5/2006 | Ferlitsch et al. | |
| 7,072,057 | B1 * | 7/2006 | Hansen | 358/1.15 |
| 7,081,969 | B1 * | 7/2006 | Motamed et al. | 358/1.16 |
| 7,084,998 | B2 | 8/2006 | Blair | |
| 7,139,085 | B1 * | 11/2006 | Sakaguchi | 358/1.15 |
| 7,148,980 | B2 * | 12/2006 | Tominaga | 358/1.15 |
| 7,155,669 | B1 | 12/2006 | Nakagiri et al. | |
| 7,161,693 | B2 | 1/2007 | Kizaki et al. | |
| 7,239,411 | B2 | 7/2007 | Kelsey | |
| 2001/0038462 | A1 | 11/2001 | Teeuwen et al. | 358/1.15 |
| 2002/0001495 | A1 | 1/2002 | Mochizuki | |
| 2002/0027673 | A1 | 3/2002 | Roosen et al. | |
| 2002/0042798 | A1 | 4/2002 | Takei et al. | |
| 2002/0059489 | A1 | 5/2002 | Davis et al. | |
| 2002/0060801 | A1 | 5/2002 | Motamed et al. | |
| 2002/0101600 | A1 | 8/2002 | Sabbagh et al. | |
| 2002/0101604 | A1 | 8/2002 | Mima et al. | |
| 2002/0112037 | A1 | 8/2002 | Koss | |
| 2002/0113989 | A1 | 8/2002 | Ferlitsch et al. | |
| 2002/0138564 | A1 | 9/2002 | Treptow et al. | |
| 2002/0163665 | A1 | 11/2002 | Iwata et al. | |
| 2002/0186407 | A1 | 12/2002 | Laughlin | |
| 2003/0002069 | A1 * | 1/2003 | Bhogal et al. | 358/1.15 |
| 2003/0011812 | A1 * | 1/2003 | Sesek et al. | 358/1.15 |
| 2003/0038962 | A1 * | 2/2003 | Shimada | 358/1.15 |
| 2003/0038964 | A1 | 2/2003 | Ferlitsch | |
| 2003/0048472 | A1 * | 3/2003 | Perdu et al. | 358/1.15 |
| 2003/0184782 | A1 | 10/2003 | Perkins et al. | |
| 2004/0042042 | A1 | 3/2004 | Utsunomiya | |
| 2004/0105122 | A1 | 6/2004 | Schaeffer | |
| 2006/0033958 | A1 | 2/2006 | d'Entrecasteaux | |
| 2006/0155825 | A1 | 7/2006 | Torii | |

FOREIGN PATENT DOCUMENTS

| | | |
|---|---|---|
| JP | 03282727 | 12/1991 |
| JP | 04-199218 | 7/1992 |
| JP | 04217550 | 8/1992 |
| JP | 05-270064 | 10/1993 |
| JP | 06-004239 | 1/1994 |
| JP | 07219731 | 8/1995 |
| JP | 08-101754 | 4/1996 |
| JP | 09-030040 | 2/1997 |
| JP | 09-130573 | 5/1997 |
| JP | 09-134340 | 5/1997 |
| JP | 09222964 | 8/1997 |
| JP | 09-319530 | 12/1997 |
| JP | 10-027149 | 1/1998 |
| JP | 10027076 | 1/1998 |
| JP | 10-031750 | 2/1998 |
| JP | 10-078618 | 3/1998 |
| JP | 10154049 | 6/1998 |
| JP | 10-187393 | 7/1998 |
| JP | 10-207643 | 8/1998 |
| JP | 10240477 | 9/1998 |
| JP | 10-283130 | 10/1998 |
| JP | 10-340166 | 12/1998 |
| JP | 10-340167 | 12/1998 |
| JP | 11-015608 | 1/1999 |
| JP | 11-024860 | 1/1999 |
| JP | 11110143 | 4/1999 |
| JP | 11-143661 | 5/1999 |
| JP | 11-167323 | 6/1999 |
| JP | 11219265 | 8/1999 |
| JP | 11296333 | 10/1999 |
| JP | 2000003258 | 1/2000 |
| JP | 2000-099303 | 4/2000 |
| JP | 2000-132347 | 5/2000 |
| JP | 2000-151873 | 5/2000 |
| JP | 2000-309147 | 11/2000 |
| JP | 2001071590 | 3/2001 |
| JP | 2001-088405 | 4/2001 |
| JP | 2001-265556 | 9/2001 |
| JP | 2005-078461 | 3/2005 |
| WO | WO01/31432 | 5/2001 |

OTHER PUBLICATIONS

U.S. Appl. No. 09/681,208—Office Action dated Jan. 8, 2007.
U.S. Appl. No. 09/681,208—Office Action dated Jul. 28, 2006.
U.S. Appl. No. 09/681,208—Office Action dated Jan. 12, 2006.
U.S. Appl. No. 09/681,208—Office Action dated May 4, 2005.
U.S. Appl. No. 09/681,208—Office Action dated Oct. 22, 2004.
U.S. Appl. No. 09/681,416—Office Action dated Aug. 11, 2005.
U.S. Appl. No. 09/681,416—Office Action dated Nov. 16, 2004.
U.S. Appl. No. 09/681,409—Office Action dated Aug. 11, 2006.
U.S. Appl. No. 09/681,409—Office Action dated Jan. 25, 2006.

U.S. Appl. No. 09/681,409—Office Action dated Jul. 29, 2005.
U.S. Appl. No. 09/681,409—Office Action dated Nov. 17, 2004.
U.S. Appl. No. 09/683,667—Office Action dated Apr. 15, 2008.
U.S. Appl. No. 09/683,667—Office Action dated Oct. 29, 2007.
U.S. Appl. No. 09/683,667—Office Action dated May 7, 2007.
U.S. Appl. No. 09/683,667—Office Action dated Nov. 17, 2006.
U.S. Appl. No. 09/683,667—Office Action dated Jun. 1, 2006.
U.S. Appl. No. 09/683,667—Office Action dated Dec. 13, 2005.
U.S. Appl. No. 09/683,667—Office Action dated Jun. 22, 2005.
U.S. Appl. No. 10/404,789—Office Action dated May 21, 2008.
U.S. Appl. No. 10/404,789—Office Action dated Nov. 28, 2007.
U.S. Appl. No. 10/404,789—Office Action dated Jul. 11, 2007.
U.S. Appl. No. 10/404,789—Office Action dated Feb. 6, 2007.
U.S. Appl. No. 10/404,789—Office Action dated Aug. 23, 2006.
U.S. Appl. No. 10/404,789—Office Action dated Mar. 15, 2006.
U.S. Appl. No. 10/404,789—Office Action dated Jul. 27, 2005.
U.S. Appl. No. 10/003,800—Office Action dated Apr. 20, 2006.
U.S. Appl. No. 10/003,800—Office Action dated Dec. 13, 2005.
U.S. Appl. No. 10/003,800—Office Action dated Jun. 15, 2005.
U.S. Appl. No. 09/683,162—Office Action dated Apr. 16, 2008.
U.S. Appl. No. 09/683,162—Office Action dated Oct. 29, 2007.
U.S. Appl. No. 09/683,162—Office Action dated May 17, 2007.
U.S. Appl. No. 09/683,162—Office Action dated Nov. 27, 2006.
U.S. Appl. No. 09/683,162—Office Action dated Jan. 10, 2006.
U.S. Appl. No. 09/683,162—Office Action dated Jun. 22, 2005.
U.S. Appl. No. 09/894,928—Office Action dated Mar. 17, 2008.
U.S. Appl. No. 09/894,928—Office Action dated Sep. 11, 2007.
U.S. Appl. No. 09/894,928—Office Action dated Mar. 2, 2007.
U.S. Appl. No. 09/894,928—Office Action dated Sep. 7, 2006.
U.S. Appl. No. 09/894,928—Office Action dated Mar. 15, 2006.
U.S. Appl. No. 09/894,928—Office Action dated Sep. 8, 2005.
U.S. Appl. No. 10/396,201—Office Action dated Jan. 23, 2007.
U.S. Appl. No. 09/932,661—Office Action dated Jun. 8, 2007.
U.S. Appl. No. 09/932,661—Office Action dated Jun. 27, 2006.
U.S. Appl. No. 09/932,661—Office Action dated Nov. 28, 2005.
U.S. Appl. No. 09/932,661—Office Action dated May 4, 2005.
U.S. Appl. No. 10/002,781—Office Action dated Nov. 17, 2006.
U.S. Appl. No. 10/002,781—Office Action dated May 1, 2006.
U.S. Appl. No. 10/002,781—Office Action dated Nov. 28, 2005.
U.S. Appl. No. 10/002,781—Office Action dated Jun. 15, 2005.
U.S. Appl. No. 09/967,592—Office Action dated Jun. 12, 2008.
U.S. Appl. No. 09/967,592—Office Action dated Dec. 12, 2007.
U.S. Appl. No. 09/967,592—Office Action dated Jun. 27, 2007.
U.S. Appl. No. 09/967,592—Office Action dated Nov. 29, 2006.
U.S. Appl. No. 09/967,592—Office Action dated Jun. 15, 2006.
U.S. Appl. No. 09/967,592—Office Action dated Jan. 27, 2006.
U.S. Appl. No. 09/967,592—Office Action dated Aug. 10, 2005.
IBM AS/40 Printing V, Oct. 2000, http://www.redbooks.ibm.com/redbooks/pdfs/sg242160.pdf.
PostScript Language Document Structuring Conventions Specification, Version 3.0, Adobe Systems Incorporated, 1992.
U.S. Appl. No. 11/548,683—Office Action dated Apr. 30, 2009.
U.S. Appl. No. 11/548,683—Office Action dated Aug. 14, 2008.
U.S. Appl. No. 10/404,789—Office Action dated Nov. 10, 2008.
U.S. Appl. No. 09/683,667—Office Action dated Oct. 31, 2008.
U.S. Appl. No. 09/967,592—Office Action dated Apr. 24, 2009.
U.S. Appl. No. 09/967,592—Office Action dated Oct. 2, 2008.
U.S. Appl. No. 09/683,667—Notice of Allowance dated Feb. 9, 2009.
U.S. Appl. No. 09/894,928—Notice of Allowance dated Sep. 15, 2008.
U.S. Appl. No. 09/932,661—Notice of Allowance dated Dec. 12, 2007.
U.S. Appl. No. 10/396,201—Notice of Allowance dated Jun. 18, 2007.
U.S. Appl. No. 09/967,592—Non-Final Office Action dated Dec. 9, 2009.
U.S. Appl. No. 11/548,683—Notice of Allowance dated Oct. 15, 2009.
Japanese Office Action JP2006-127818 corresponding to U.S. Appl. No. 11/125,524 which has technical similarities to the present application.
Japanese Office Action JP2002-327343 corresponding to U.S. Appl. No. 10/010,112 which has technical similarities to the present application.

* cited by examiner

Fig. 7 *(PRIOR ART)*

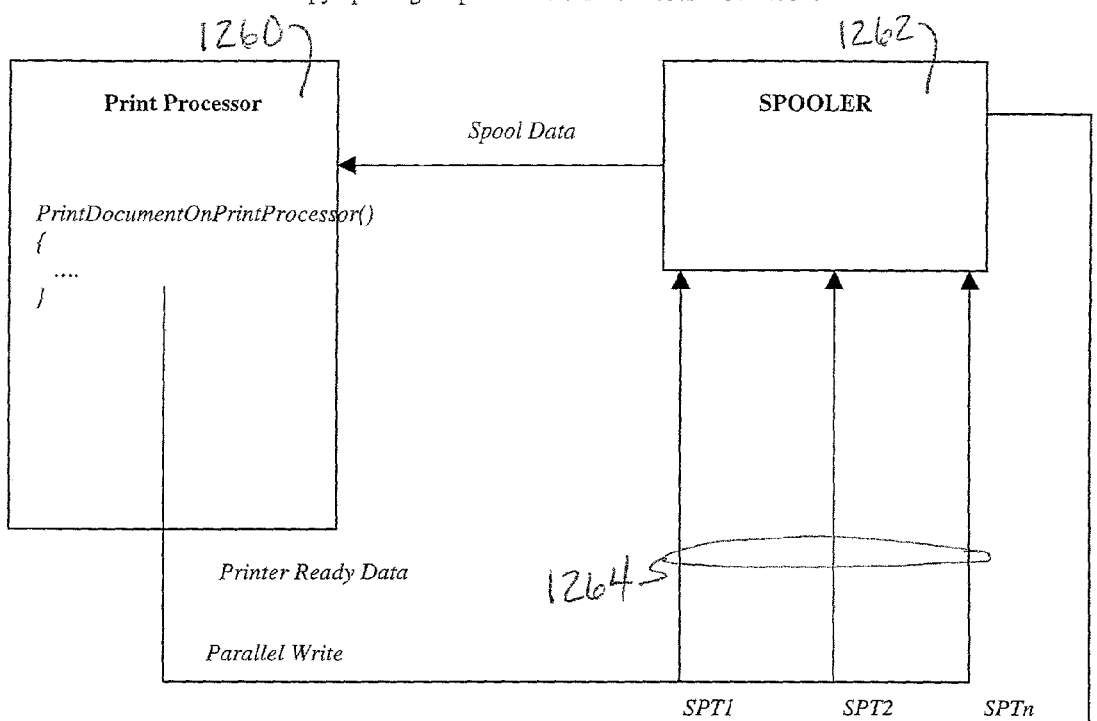
FIG. 13
Print Processor Based Load Balancing
Copy Splitting – Spooler & Print Processor - *RAW Mode*
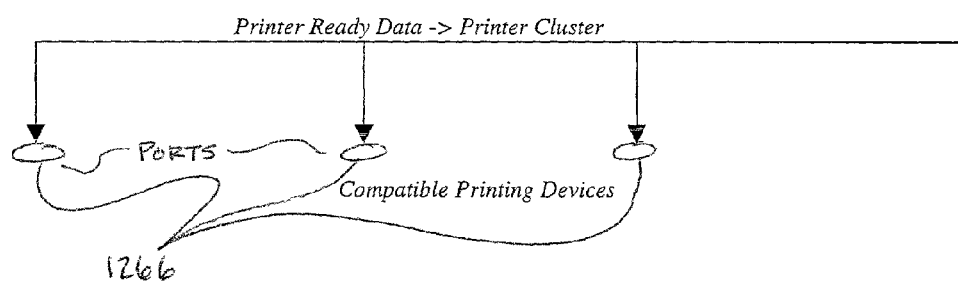

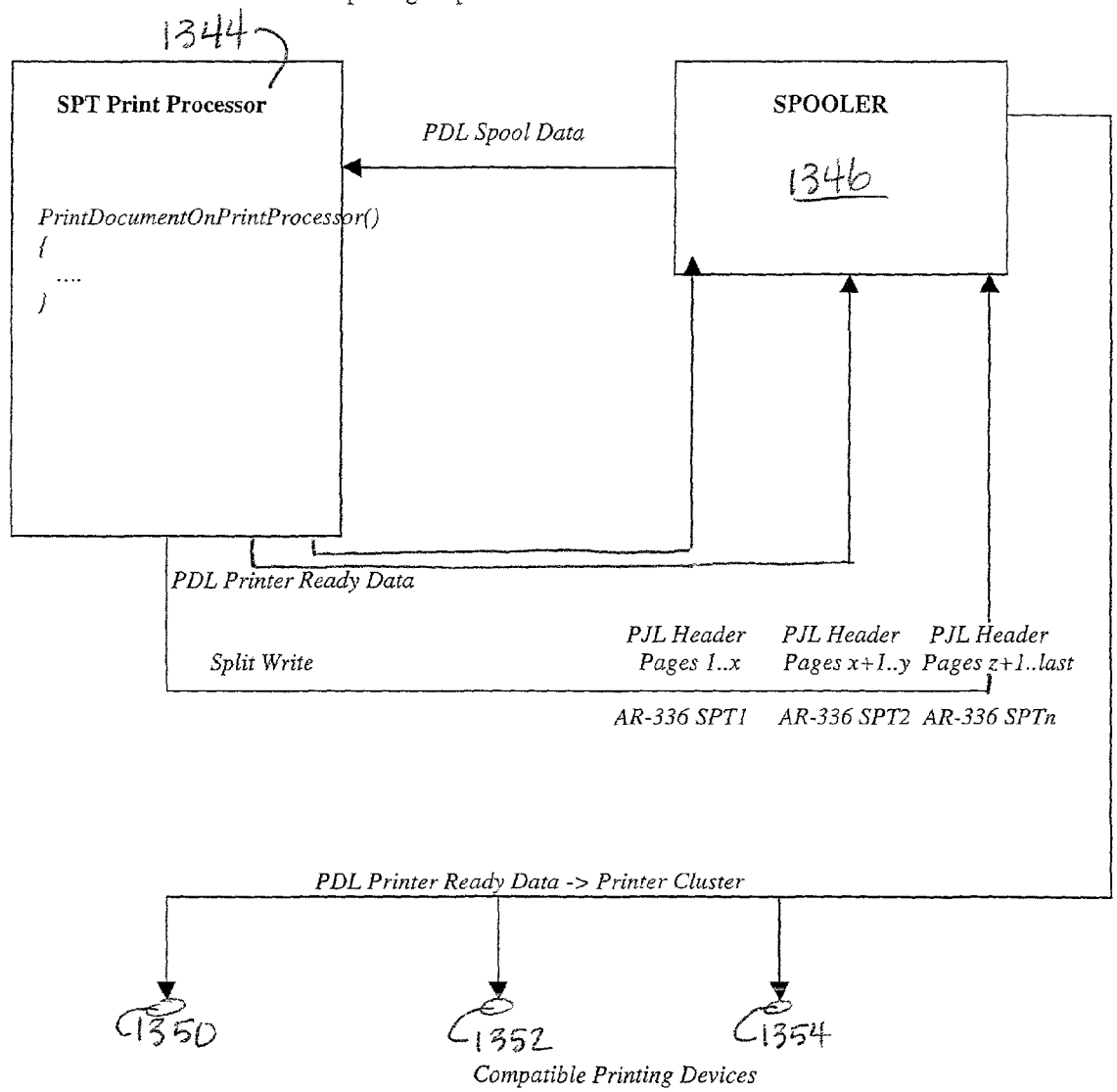

METHODS AND SYSTEMS FOR PRINTING DEVICE LOAD-BALANCING

CROSS REFERENCE TO RELATED APPLICATIONS

This application is a continuation-in-part (CiP) of U.S. patent application Ser. No. 09/894,928, filed Jun. 28, 2001, entitled "Methods and Systems for Page-Independent Spool File Sheet Assembly," invented by Andrew Rodney Ferlitsch, et al., now U.S. Pat. No. 7,480,068; which is a continuation-in-part (CIP) of two U.S. patent applications: U.S. patent application Ser. No. 09/681,409, filed Mar. 30, 2001, entitled "Methods and Systems for Print-Processor-Based Printer Status Detection and Print Task Distribution," invented by Andrew Rodney Korlitsch, et al.. now abandoned; and U.S. patent application Ser. No. 09/681,416, filed Mar. 30, 2001, entitled "Methods and Systems for Print-Processor-Based Print Task Error Recovery," invented by Andrew Rodney Ferlitsch, et al., now U.S. Pat. No. 7,046,384; both of which are continuation-in-part patent applications of U.S. patent application Ser. No. 09/681,208, filed Feb. 22, 2001, entitled "Methods and Systems for Print-Processor-Modified Printing," invented by Andrew Rodney Ferlitsch, et al., now abandoned; which claims the benefit of U.S. Provisional Patent Application Ser. No. 60/261,132, entitled "Methods and Systems for Print-Processor-Modified Printing," invented by Andrew Rodney Ferlitsch, et al., filed Jan. 11, 2001.

BACKGROUND

Many offices can generate a high volume of printer output or require high print rates to meet deadlines. When these needs are fairly constant, large, high-production printers and associated hardware may be required. These high-production units are expensive to procure and maintain and, generally, are only made economically feasible by a constant high demand for printer output. When printer requirements fluctuate, the costs of these high-production printers are difficult to justify. However, when sporadic, high printer throughput is a necessity, some offices are forced to bear the costs of expensive printer equipment that runs at well below its capacity most of the time.

Cluster printing has been introduced to avoid this problem. Cluster printing involves the use of multiple printers in a network. With cluster printing, print jobs can be sent to a multiple printer network with a capacity that rivals the capacity of expensive, high-throughput equipment. Generally, this network is comprised of multiple lower-production printers that may already exist in an office environment making the cost of the network very manageable.

Through the use of cluster printing, a user may choose to split a single print job among several printers to increase print job speed and decrease print time. Print jobs that include multiple copies may be divided so that each printer in a network prints some of the copies. Other variations of print job distribution may also be implemented.

Cluster printing may be implemented through specialized printers that contain cluster-enabling firmware. When these printers are interconnected via cables, they can share printing jobs. In some cases, the marking engines are connected to enable division of printing tasks between the connected printers.

Other methods of implementing cluster printing functions require the use of additional hardware. Typically, a specialized print server is used. This server is generally a high-performance general purpose computer to which print jobs are directed by the network. Specialized software on the server allows print jobs or copies thereof to be distributed among multiple printers that are managed by the server.

These known cluster printing implementations require specialized printer or server hardware or software to provide cluster printing functions.

Cluster printing may be improved or optimized through the use of load balancing. Load balancing distributes print tasks among available printers according to the printers' capabilities. Faster printers may receive larger print tasks or more print tasks than slower printers in order to finish a print job in the less time overall. Printer capabilities and capacities may be used to determine the loads assigned to each printer.

Many computing device platforms and printing systems are available today and embodiments of the present invention may be implemented with many of these systems, however, due to the prevalence of the Microsoft Windows® operating system family, embodiments used in conjunction with Windows® systems will be used to illustrate its functions. Accordingly, details of Microsoft Windows 95® and related Microsoft Windows® printing processes will be explained.

Microsoft Windows® operating systems typically employ two file types in the printing process. These file types are Enhanced Metafile (EMF) and raw format (raw) files.

Raw format files are device dependent files that are destined and formatted for a specific device. An example of a raw file is an encapsulated Postscript file, which is formatted to be interpreted by a Postscript printer. EMF files are device independent files that contain graphic device interface (GDI) function calls that reproduce an application's graphic objects on a printer. EMF files are used to quickly record a printed document and return system control to a user. After control is returned to the user, the function calls stored in the EMF file may be executed and sent to the printer in the background.

Files may be recorded for later play back by using a spool file that is written and later de-spooled to a printing device. Spool files may be used for EMF and raw files. However, a print job may also be written directly to a printing device without using a spool file. Some typical printing process scenarios using raw spool files and EMF spool files are described below to introduce the elements and relationships of these processes and how they relate to embodiments of the present invention. These scenarios are derived from information contained in the Microsoft Windows 95® Driver Development Kit (DDK) documentation, the Microsoft Windows 2000® DDK documentation and the Microsoft Windows NT® DDK documentation, incorporated herein by reference.

A typical printing process scenario using a raw spool file may be described in reference to FIG. 1 wherein an application 10 initiates a print request 1 by calling a graphic device interface (GDI) 12. Application 10 may be a word processor, spreadsheet, browser, database program or some other program that runs on the underlying operating system. Typically, application 10 will create a device context (DC) and draw an object (i.e., a circle, a line, etc.) to the DC. The application 10 will then call the GDI with a print request directed to a particular printer 16 (FIG. 2) using that DC.

The GDI 12 will call the printer driver 14 associated with the particular printer 16 and request 2 instructions on how to render the object on that particular printer 16. The printer driver 14 will return 3 the instructions on how to render the object on the printer 16. In Windows 95® used in this printing process example, the printer driver 14 is written in 16-bit code and communicates with a 16-bit GDI 12. This GDI will then pass the print request to a 32-bit GDI (GDI32) 18 to handle the 32-bit Windows 95® spooler process. GDI32 makes an inter-process call 5 to the spooler process 20.

Spooler process 20 calls 6 the router 22 to route the print job to printer 16. In this example, illustrated in FIGS. 1-2, the router 22 sends the print job to a local print provider 24. In other scenarios, the router 22 may send print jobs to a network printer through a network print provider (not shown). When the default Windows 95® spooler is used, network print jobs are spooled and de-spooled on the client machine just as local print jobs. The network print server is contacted only during despooling. Windows NT/2000® client machines handle print jobs to network print servers differently, these machines use remote procedure calls (RPCs) to call the necessary printing application program interfaces (APIs) on the print server. In these NT/2000 scenarios, the print jobs do not show up on the local spooler queue, the print spooler on the print server handles spooling and de-spooling. This RPC method can be used in conjunction with Windows 95® spoolers also. Print jobs to locally connected printers or locally queued to (LPR) to network printers are handled similarly to Windows 95, 98 local print jobs.

In this local printing scenario, the router 22 calls the local print provider 24 with the print job. Local print provider 24 writes or "spools" 8 a raw spool file 26 to disk for later access. This is done to avoid waiting for the printer to complete the job before control is returned to the application. These steps from initiating the print request 1 to writing to spool file 26 may be repeated many times. Data may be appended to spool file 26 until an application signals that the print job is complete. This may be signaled with an EndDoc function. Local print provider 24 also starts 9 a background thread 28 that will determine the best time to start playing back or "despooling" the spool file 26 to the printer 16.

In reference to FIG. 2, Thread 28 monitors spooler subsystem resources to determine a good time to playback spool file 26. When thread 28 determines that playback should commence, a StartDoc function call 17 is sent to print processor 32 to start a new print processor thread 11. Print processor thread 11 invokes the local print provider 24 with a ReadPrinter function call to read part of the spool file 26. A print processor thread 19 also uses the local print provider 24 to invoke the language monitor 34 with a WritePrinter function call to send data through the physical port 38 connected with the bi-directional printer 16 specified previously.

For raw spool files, the default print processor 32 simply passes data through without changing or interpreting any of the information. A language monitor 34 is used in this example because the destination printer 16 is a bi-directional printer. When non-bi-directional printers are used a port monitor 36 would be invoked instead of the language monitor 34. A language monitor 34 and port monitor 36 may be separate components or may be integrated into one monitor.

Language monitor 34 calls 13 a port monitor 36 to send print job data to the printer 16. The port monitor 36 then sends 15 the raw data through the physical port 38 to the printer 16. This process of reading from a spool file 26 and forwarding data to the printer 16 may be repeated several times to complete a print job. This is typically repeated until an end-of-file is reached or the job is cancelled. The playback thread 19 is terminated at that point. The combination of spooler process, router, local print provider, print processor, language monitor and port monitor may be referred to collectively as a "spooler" 30.

When Windows Enhanced Metafile (EMF) format files are used in the printing process of Windows 9.x systems, process components interact differently than with raw files. An example printing process, shown in FIGS. 3 and 4 illustrates the printing process using EMF files.

This process typically commences when an application 40 creates a printer DC and draws an object to the DC (not shown). The application 40 then calls 41 GDI 50 with an EMF spooling request for a designated printer 68. GDI 50 queries 42 the printer driver 52 associated with the designated printer 68 to determine whether the driver 52 supports EMF spooling. If the driver 52 supports EMF spooling, GDI 50 changes the printer DC to an EMF DC and writes 43 the instructions for rendering the object to the EMF DC 54 (creates EMF files). GDI 50 then passes 44 the print request to the 32-bit GDI (GDI32) 56 because, in this example the Windows 95® spooler process is 32-bit code. GDI 32 subsequently makes an inter-process call 45 to the spooler subsystem 70 with a description of the print j The spooler process 58 (SPOOL32.EXE), in the spooler system 70, calls the router 60 to pass the print job description to the print provider 62 that can reach the designated printer 68. In this example, a local print provider 62 is used, but a network print provider may also be used. When the default Windows 95® spooler is used, network print jobs are spooled and de-spooled on the client machine just as local print jobs. The network print server is contacted only during despooling. Windows NT/2000® client machines handle print jobs to network print servers differently, these machines use remote procedure calls (RPCs) to call the necessary printing application program interfaces (APIs) on the print server. In these NT/2000 scenarios, the print jobs do not show up on the local spooler queue, spooling and despooling are handled by the print spooler on the print server. This RPC method can be used in conjunction with Windows 95® spoolers also.

When the router 60 has called the print provider 62, the local print provider 62 creates 48 a job description file 64 and adds 48 a record to the job description file 64 each time it is called for the job until all the EMF page files have been spooled and each EMF file name and location is recorded in the job description file 64. When information about the last EMF file in the print job has been recorded, the local print provider 62 will call the spooler process 58 with an EndDoc function call. This signals the spooler process 58 that the complete job is spooled and ready for despooling. For multi-page jobs, these steps from initial spooling request 41 to job description file recording 48 are repeated for each page of a job.

When EMF file spooling is complete, the spooler process 58 sets a ReadyToPrint attribute on the print job and initiates an event 49 that signals to the port thread 66 that a job is available for printing. Port thread 66 responds to this event by determining the best time to start the despooling process and, at that time, loads 81 the print processor 72, as shown in FIG. 4. The print processor 72 will determine that the file format is EMF and call GDI32 56 with a Windows 95® function call 82.

GDI32 then invokes a gdiPlaySpoolStream function to read 83 from the job description file 64 that provides a fully qualified path to an EMF spool file 54. Through the job description file 64 that comprises a list of path names to EMF files, GDI32 knows about all the pages in the print job. The GDI32 gdiPlaySpoolStream function also calls GDI 50, using a thunk built into GDI32, with the path to the EMF spool file to render the page. GDI 50 only knows about one page in the print job at a time.

GDI 50 calls the printer driver 52 associated with the designated printer 68 chosen in application 40 and obtains a DC for the printer 68. GDI 50 then reads page-rendering instructions from the spooled EMF file 54 and passes 85 them one at a time to the printer driver 52 which uses as many instructions as are necessary to render the first part of the page. When the 16-bit printer driver 52 renders a part of the page, it passes 87 the printer-specific raw page data back to the GDI 50 which, in turn, passes 88 the raw data to GDI32 56. GDI32 56 then passes 89 the raw data to the spooler process 58 which then follows the same procedures it would for a raw format files as explained above.

Spooler process 58 calls 90 the router 60 to route the print job to printer 68. In this example, illustrated in FIGS. 3 and 4, the router 60 sends the print job to a local print provider 62. In other scenarios, the router 60 may send print jobs to a network printer through a network print provider (not shown). In this local printing scenario, the router 60 calls the local print provider 62 with the print job. Local print provider 62 invokes the language monitor 74 with a WritePrinter function call to send data through the physical port 78 connected with the bi-directional printer 68 specified previously.

A language monitor 74 is used in this example because the destination printer 68 is a bi-directional printer. When non-bi-directional printers are used a port monitor 76 would be invoked instead of the language monitor 74. A language monitor 74 and port monitor 76 may be separate components or may be integrated into one monitor. Language monitor 74 calls 93 a port monitor 76 to send print job data to the printer 68. The port monitor 76 then sends 94 the raw data through the physical port 78 to the printer 68.

Parts of EMF pages are processed in this manner and printed until an entire page is printed. GDI32 56 then gets the path to the EMF spool file for the next page and calls GDI 50 to use the instructions in that EMF file to render the next page of the print job. The print job is finished when all the paths to EMF spool files are used up.

Other versions of the Microsoft Windows operating systems, such as Windows NT and 2000 may use different printing processes as described with reference to FIG. 5. These processes may be used to print data to local, network and remote printers either directly or through a network print server. EMF data may also be processed differently. For example, in Windows NT and 2000, the entire EMF data for all pages is passed to GdiPlayEMFO in one pass, rather than one page at a time. If the EMF data is to be queued on a print server, the EMF data is passed directly to the print server without rendering on the client. A mirror copy of the driver on the server renders the EMF data instead.

Typically, a user will employ an application 100 to create a print job by calling GDI 102 functions. The GDI 102 and/or application 100 will then call Winspool.drv 104, which is a client interface into the spooler. This client interface, Winspool.drv 104, exports the functions that make up the spooler's Win32® API and provides RPC stubs for accessing the server. The print job is then forwarded to the spooler's API server, Spoolsv.exe 106 that can be implemented as a Windows 2000 service that is started when the operating system is started. This API server module exports an RPC interface to the server side of the spooler's Win32® API. This module implements some API functions, but most function calls are passed to a print provider by means of the router, spoolss.dll 108.

The router 108 determines which print provider to call, based on a printer name or handle supplied with each function call, and passes the function call to the correct provider 110, 112 or 114. If the selected printer is managed by the client system, the local print provider, localspl.dll 110, handles the print job. Printers managed by the local print provider 110 do not have to be physically local to the client, they may also be directly connected to network cards without using a server. When these printers are used, the print job is passed to the kernel-mode port driver stack 116 and on to the printer 118.

When printers located on a Windows NT/ Windows 2000 server are selected, the router 108 directs the print job to the network print provider, Win32spl.dll 112. This network provider uses RPC to redirect calls from the client's router to the network server's spoolsv.exe process 124, which forwards the print job to the network server's router 126. Because the network printer is local to the print server system, the network server router 126 routes the job to the server's local print provider 128. The job is then directed to the server's kernel-mode port driver stack 130 and out to the selected network printer 132.

Remote printers may also be used with these systems. When a remote printer is selected, the client router 108 may direct the print job to the local print provider 110 which will forward the job to the kernel-mode port driver stack 116 and on to the remote printer 142 using a network protocol. When the local print provider 110 accesses a remote printer 142, the provider 110 uses a port monitor that can use network protocols recognized by the remote printer or its server.

Printers managed by non-Windows NT/2000 servers (e.g., Novell servers) may also be accessed through this print system. This may be achieved by using a local print provider 110 that directs the print job to the kernel-mode port driver stack 116 and on to the printer's server 136 using a type of network protocol. The server 136 then directs the job to the destination printer 140. This may also be achieved using a customized print provider 114 which sends the job to the kernel-mode port driver stack 116 which uses a network protocol to send the job on the printer's server 134 which then directs the job to the destination printer 138.

An example of these printing processes may be explained with reference to FIG. 6, which illustrates a Windows 2000 print process. In this process, an application 150 is used to create a print job with the Graphics Device Interface (GDI) 152. When the print job's initial output file is in raw format 154, the printer driver's printer graphics DLL 156 works in conjunction with the GDI 152 to create a print job that is sent to the client interface 160 of the spooler 190. Client interface 160 sends the job to the API server 162 which forwards the job to the router 164. In this example, the router 164, sends the job to the local print provider 165 as it is a local print job.

Within the local print provider 165, a print job creation API 168 is invoked. This API 168 accesses the printer driver's printer interface DLL 174 and creates a job spool file 176. The job creation API 168 also forwards job information to the job scheduling API 170 which initiates a job scheduler thread 172.

At this point, the file format is checked 178. If the initial job file is in a raw format already, the job is sent to the language monitor DLL 182 and on to the port monitor 184 which sends the job to the kernel-mode port driver stack 186. Port driver stack 186 sends the job to the selected printer 188 for final printing.

When an application 150 creates a print job with GDI 152 in EMF format, the job is sent 154 to a client spooler interface 160. Client interface 160 sends the job to the API server 162 which forwards the job to the router 164. Again, in this example, the router 164, sends the job to the local print provider 165 because the print job is local.

Within the local print provider 165, a print job creation API 168 is invoked. This API 168 accesses the printer driver's printer interface DLL 174 and creates a job spool file 176. The job creation API 168 also forwards job information to the job scheduling API 170, which initiates a job scheduler thread 172.

At this point, the file format is checked 178. If the initial job file is in EMF format, the job is sent to the print processor DLL 180 which directs the job back to GDI 152 for conversion to raw format with the help of printer interface DLL 174. The converted job is then sent back through the spooler client interface 160, API server 162 and router 164 to the print provider 165. In the local print provider, the job is processed by the print job creation API 168, job scheduling API 170 and job scheduler thread 172. Because the job is now in raw format, the job is sent to the language monitor DLL 182 and on to the port monitor DLL 184 and kernel-mode port driver stack 186 before arriving at the destination printer 188.

SUMMARY

Embodiments of the present invention comprise methods and systems which enable a user to distribute print tasks to a plurality of printing devices and balance the load assigned to each printer according to the printers' capabilities. These methods and systems can be implemented without the use of additional hardware or server software for this purpose. These systems and methods are typically used in conjunction with a computer network comprising at least one computing device and a plurality of printing devices. Printing tasks which are typically sent to a single printing device may be distributed to multiple printing devices according to device capabilities to increase printing speed, volume and/or capacity. This distribution capability can be achieved without the use of additional hardware and firmware and without modification to software applications.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 13 is a diagram depicting additional elements of the RAW mode, copy-splitting process of FIG. 12;

FIG. 17 is a diagram depicting additional elements of the RAW mode, job-splitting process of FIG. 16.

DETAILED DESCRIPTION

Figure 1:
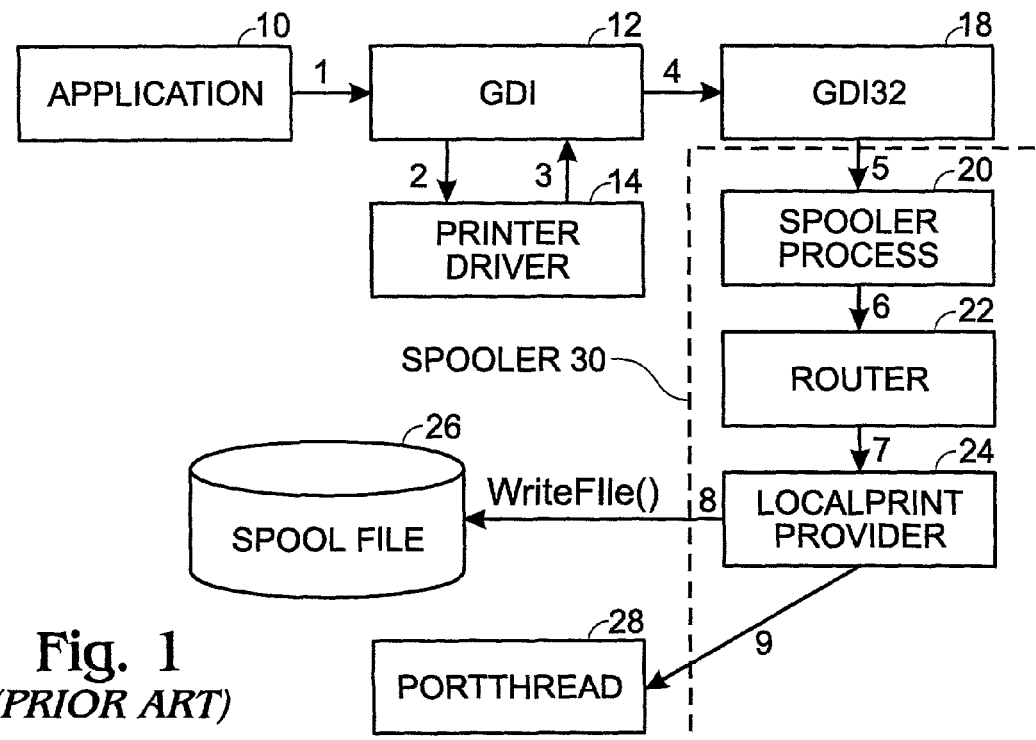
FIG. 1 is a diagram depicting a typical prior art printing process using a raw spool file.
Figure 2:
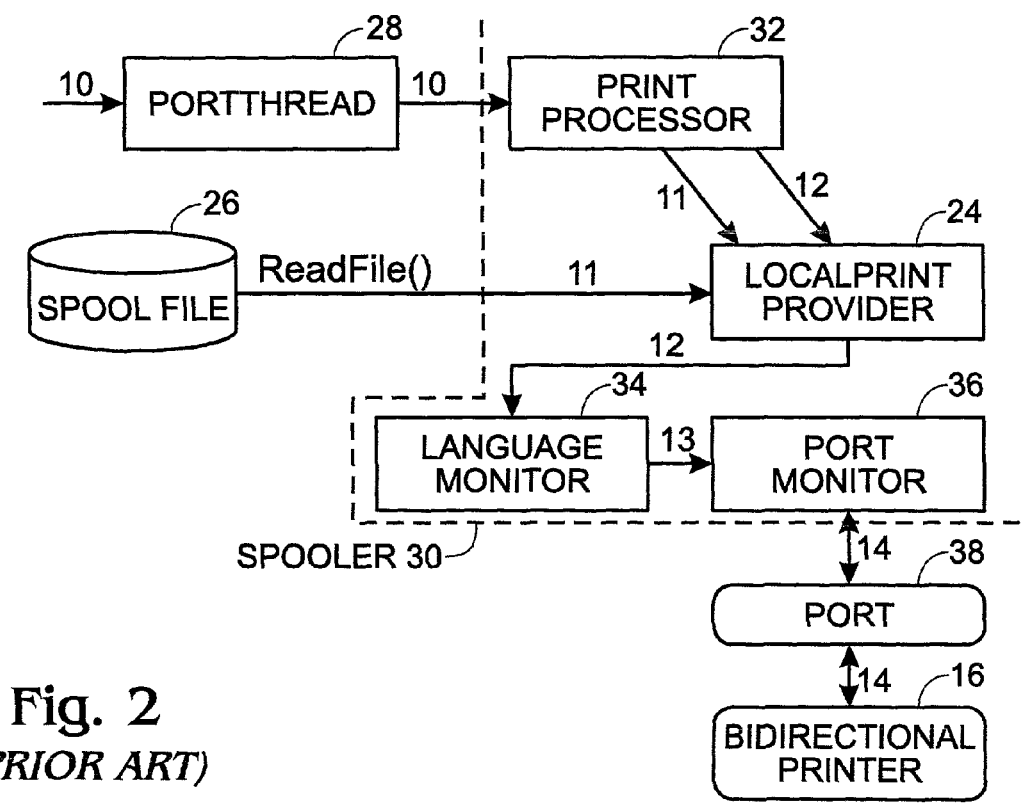
FIG. 2 is a diagram depicting a continuation of the typical prior art printing process using a raw spool file shown in FIG. 1.
Figure 3:
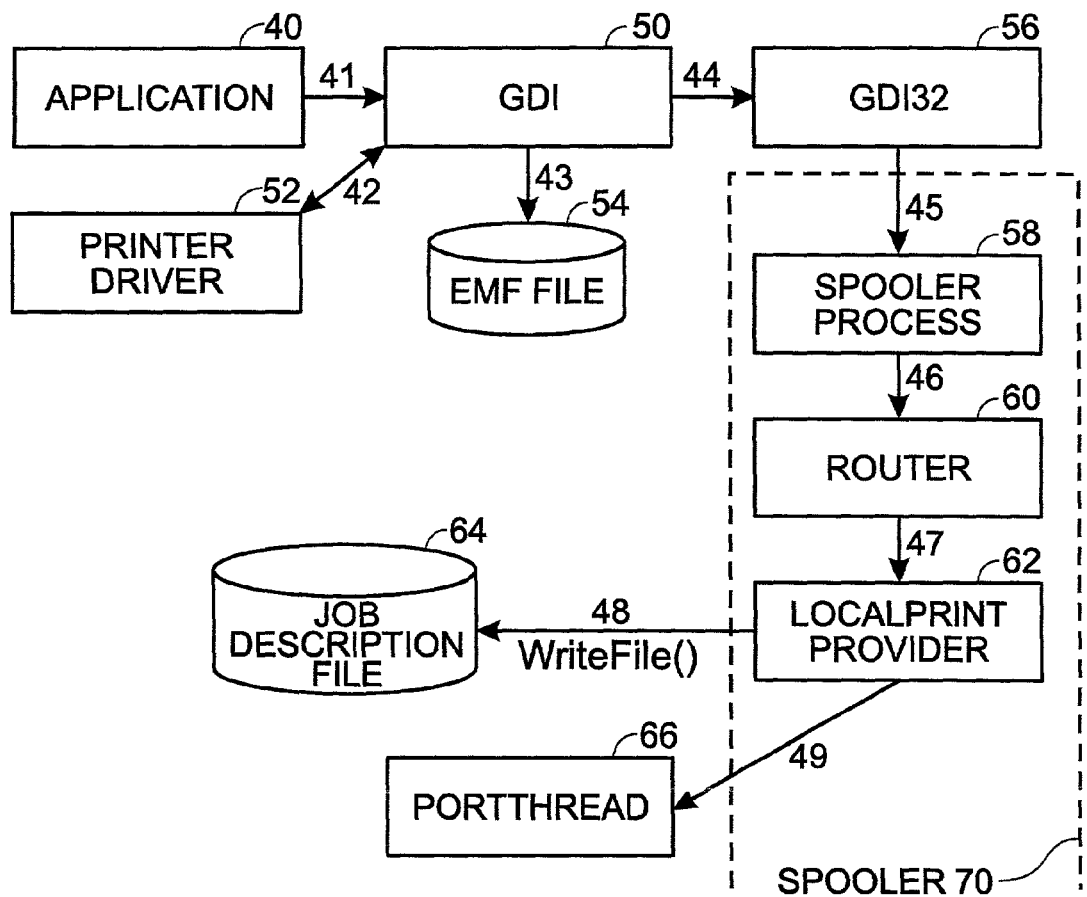
FIG. 3 is a diagram depicting a prior art printing process wherein EMF files are spooled.
Figure 4:
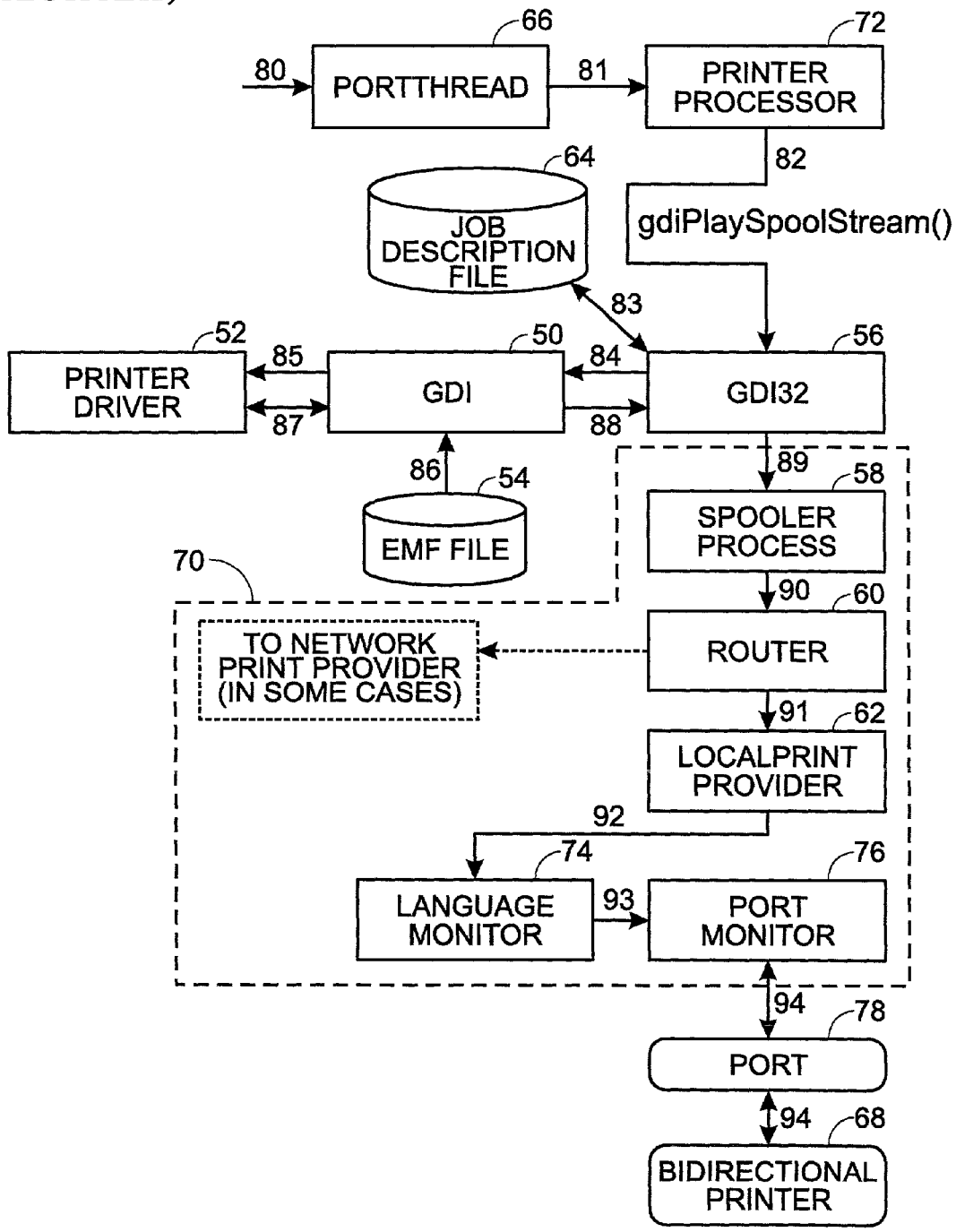
FIG. 4 is a diagram depicting a prior art printing process wherein EMF files are de-spooled.
Figure 5:
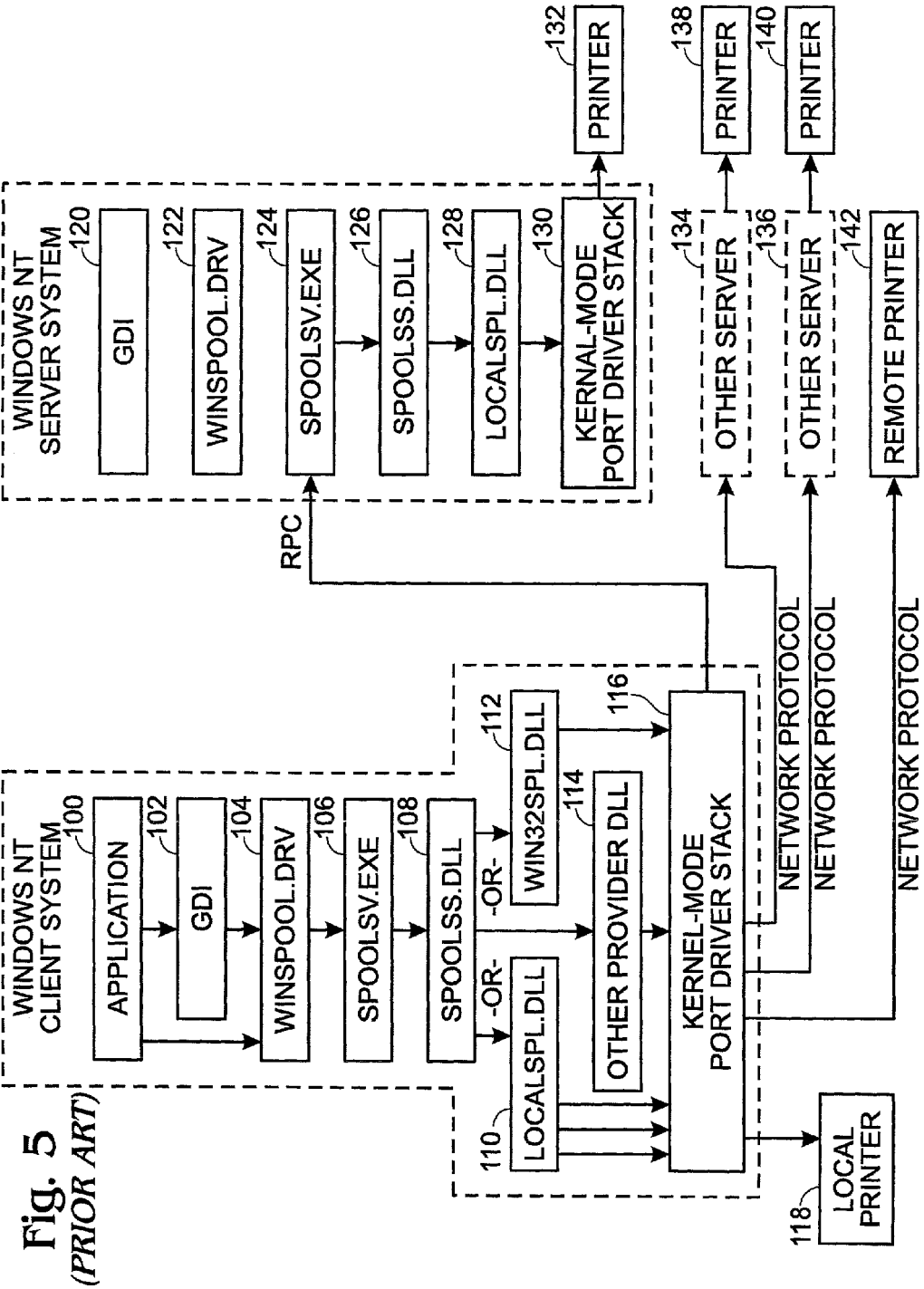
FIG. 5 is a diagram depicting a prior art printing process used in a Microsoft Windows NT/2000 operating system.
Figure 6:
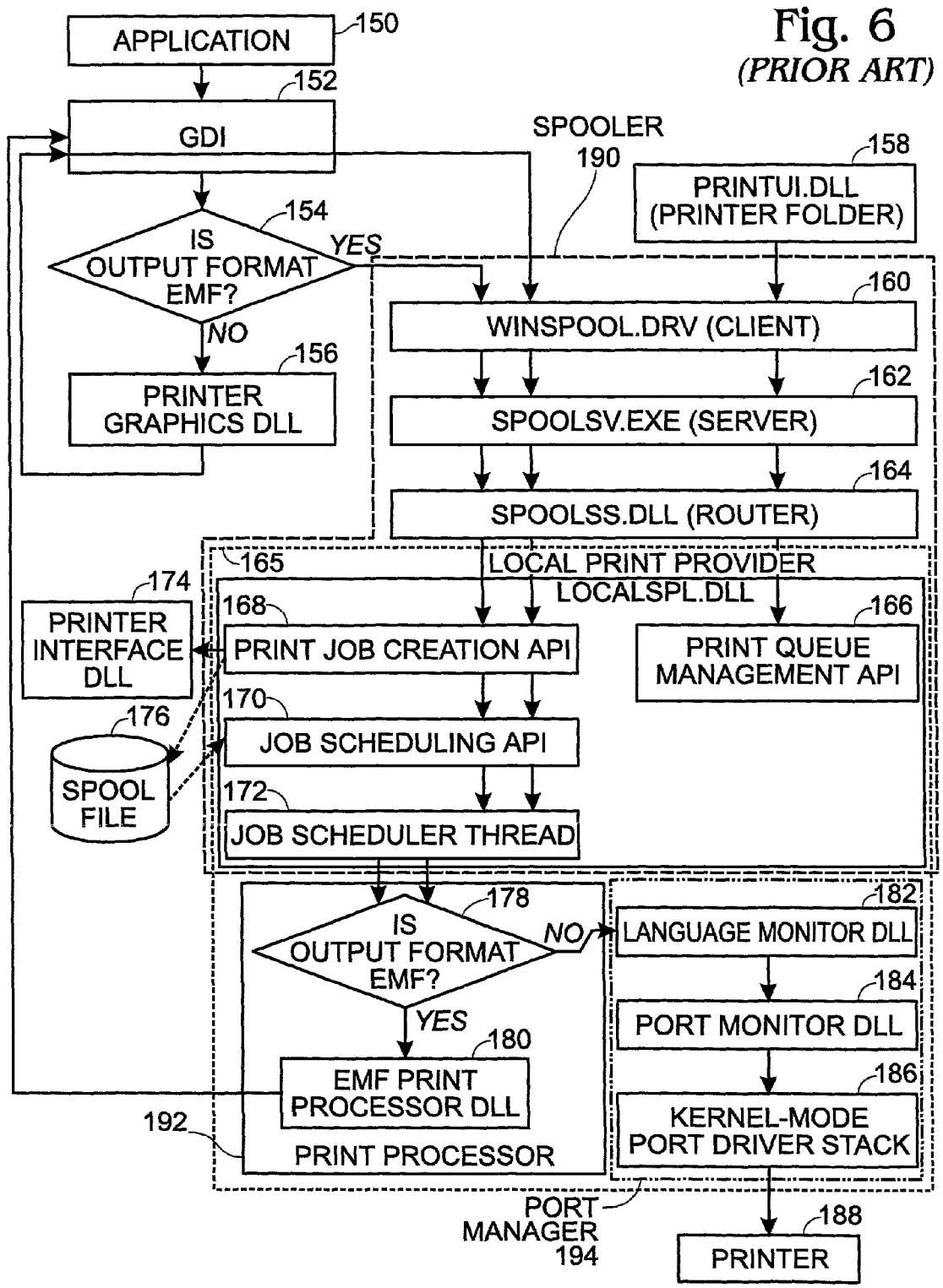
FIG. 6 is a diagram depicting the prior art printing process used in a Microsoft Windows NT/2000 operating system shown in FIG. 5.

To simplify discussion of a printing system some groups of system components may be referred to collectively. A group of components comprising a spooler client interface 160, spooler API server 162, router 164, print job creation API 168 and job scheduling API may be referred to as a spooler 190 in a Windows NT/2000 operating system. A group of components comprising a language monitor 182, port monitor 184 and port driver stack 186 may be referred to as a port manager 194. A group of components comprising a file format director 178 and EMF print processor DLL 180 may be referred to as a print processor 192. Equivalent component groups may be referred to by these terms also whether in a Microsoft operating system or another system.

The systems and methods of embodiments of the present invention typically operate within a system comprising one or more printers connected together in a common network environment (locally connected, remotely connected through network print queue or combinations thereof), a computing device capable of spooling a print job, and a printer driver and print processor compatible with the printing devices, such as in the Microsoft Windows 9x, NT, 2000 and XP operating systems.

Generally, a user initiates a print job that may consist of one or more documents, each consisting of one or more pages, and collectively consisting of one or more copies. A print job may be pre-processed into printer-ready data, such as when an application renders its output in a Page Description Language (PDL), such as Hewlett Packard's Printer Command Language (PCL), Adobe's Postscript, Adobe's Portable Document Format (PDF), a Tagged Image File Format (TIFF) or rasterized (as typically done for inkjet printers), as non-limiting examples. A print job may also be journaled, where the rendering instructions are recorded, and the playback of the rendering instructions is deferred, such as when Microsoft's Enhanced Meta File (EMF) format or Sharp's Printer Meta File (PMF) format, for example.

In many operating systems including variations of Microsoft Windows and others, a user typically selects a command, a sequence of commands, and/or some stimulus to signal to the computing device that the user intends to spool a print job. The computing device responds to the user by presenting the user with a dialog (e.g., a Printer UI, command line query, front panel display) in which the user may select options relating to the spooling of the print job. One of these options is the selection of the printing device(s) (e.g., printer, plotter, MFP, CD burner, etc.) to which to de-spool the print job. Once the printing device(s) is/are selected, the computing device responds by loading the printer driver and print processor associated with the printing device(s) and the printer driver responds, automatically or by user initiation, to the user by presenting the user with a dialog in which the user can select options relating to the printing device's capabilities. For example, and not by way of limitation, a user may select print quality, paper size, orientation, tray selection, manual feed, stapling, watermarks and other options.

In the systems and methods of the present invention a dialog may be presented to the user for selecting options specific to the printing device's capabilities and may include cluster printing options. A user may select from options enabling job splitting, copy splitting and other print task distribution options for multiple printing devices. Individual printing devices in communication with the user's computing device may also be displayed along with the capabilities of each device such as printing device pages-per-minute (PPM), tray capacities and other capabilities, capacities and/or availability. Options for cluster printing and load balancing may also be pre-selected by a user or administrator.

In some embodiments of the present invention the print processor may display this user dialog. These embodiments may be used in conjunction with any standard printer driver without modification to the driver.

In other embodiments, the print job may be initiated by another process and the selection of print options may be obtained by other means such as default settings, job tickets and other methods.

Once the user has completed selecting options specific to both the print job and the printing device(s), the computing device initiates the spooling of the print job. The steps in this process may comprise: 1) the printer driver constructing print job specific information (e.g. DEVMODE in Microsoft Operating Systems); 2) compilation of rendering instructions; and either 3) rendering (i.e., preprocessing into printer ready data); or 4) recording for deferred playback (i.e., journaling). A print job may already be rendered, partly or wholly, into printer ready data. In this case, the step of compiling rendering instructions may then be skipped partly or entirely.

The output from the print driver (i.e., spooled print job) may additionally contain information regarding sheet assembly options selected for the print job. These options may include order, scale/placement, collation and others. The output is generally referred to as a spool file and the contents are generally referred to as spool data. This data may be stored on disk, in memory, in cache, or any other form of storage compatible with the computing device.

Once the spool file has been created, the computing device passes, immediately or delayed, control of the spool file to the associated print processor for the selected printing device(s). This system may be referred to as a spooler. The print processor reads the spool file and determines if the content is pre-processed printer-ready data (e.g., RAW mode in the Microsoft Operating Systems), or journaled (e.g., EMF mode in the Microsoft Operating System).

At this point, in known systems and methods, the Spooler passes chunks of spool data to the Print Processor, until all of the spool data has been read. The Print Processor makes no interpretation of the spool data contents, but processes the data in one of two paths, depending on whether the data is recorded for deferred playback (i.e., journaled), or printer-ready data (i.e., rendered). Clustering options may also be determined by the print processor including, but not limited to, splitting the print job and/or splitting copies of the print job, printing device selection and alternate printing device selection, if any. A default printing device, such as the first selected printing device may also be used.

Figure 7:
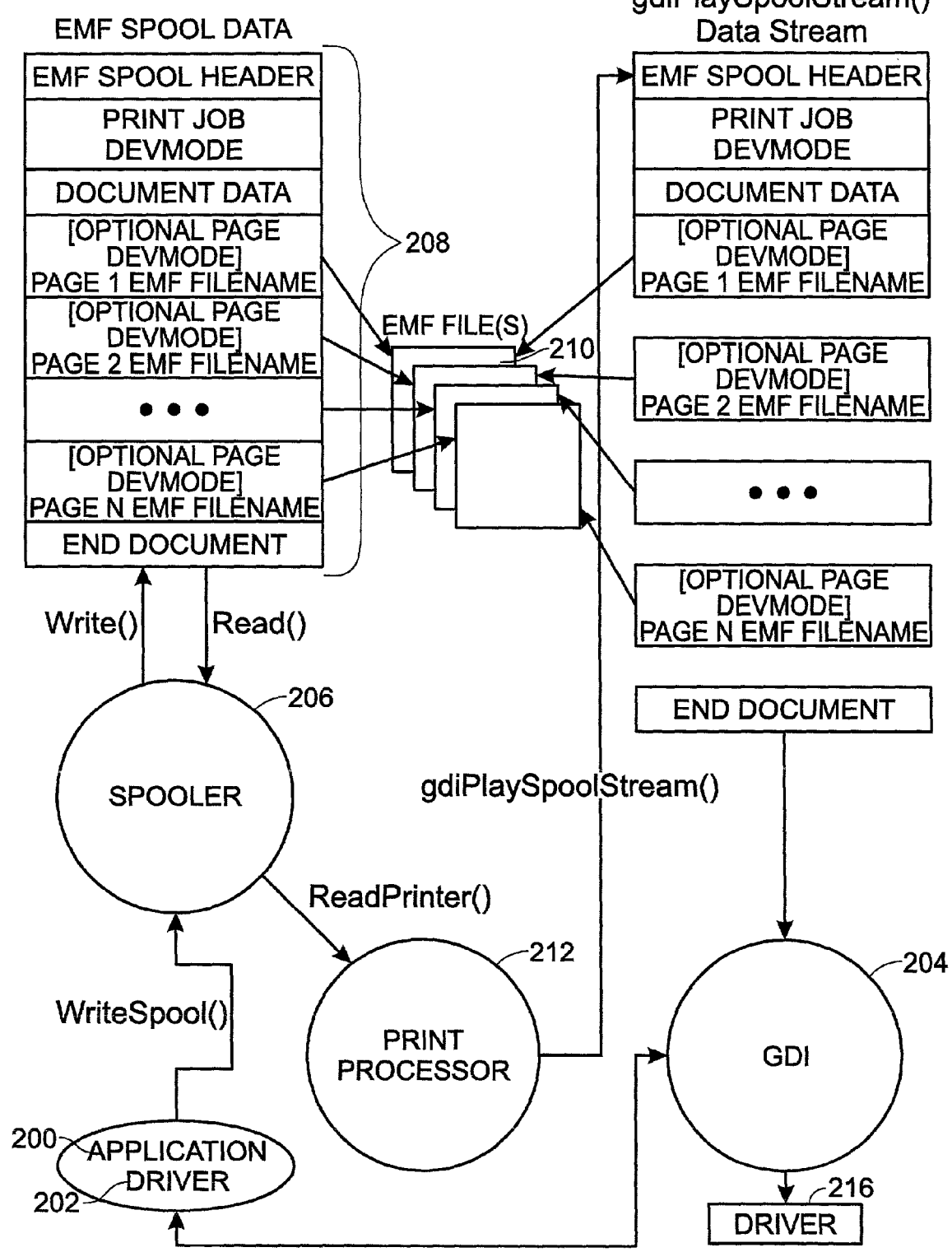
FIG. 7 is a diagram depicting an EMF mode printing process.

In some printing systems such as those used in Microsoft Windows 9x, Me, NT, 2000, XP and other systems, print data may be stored in one or more spool files as shown in FIG. 7. These spool files may use a Windows Enhanced Metafile (EMF) format to quickly record a print job and allow an application to continue running while the print job is completed. In other operating systems similar journaled files may be used.

In reference to FIG. 7, an application 200 works in conjunction with a print driver 202 and a GDI 204 to create a print job as explained above. This print job is sent to a spooler 206 such as spoolers 30, 70, 190 or others. Spooler 206 creates one or more spooler data files 208 comprising print data, Devmode data and one or more EMF filenames. Devmode data is device initialization and environment data. Typically, in a Windows 9x or Me system, multiple EMF files will be used to record a multi-page print job. Spooler data file 208 may take the form of a job description file 64, may be part of spool file 176 or may be represented in another manner depending on the particular operating system and print job type. A GDI 204 or spooler 206 will also create one or more EMF files 210 to store print data. In Windows NT/2000, a single EMF file is created with the EMF data for each page embedded within in sequential order.

After these files are created, control is passed to the print processor 212. When the system determines that actual printing should commence, the print processor 212 plays the print data stored in spool data file 208 and EMF files 210. This data is played to the GDI 204, for example GDI 50 or 152 where it is converted with the help of a driver 216 to a printer-ready format that is forwarded to a printer.

If the spool file was recorded for deferred playback (i.e., journaled, such as EMF, etc.), each chunk of spool data is played back to the printer driver and Graphics Device Interface (GDI) associated with the targeted printer (in a Microsoft operating system). In some situations, the playback may not consume the entire chunk of spool data and may push some of the data back to be played again. For example, the GDI in a Microsoft operating system may play one EMF file at a time, and push back any remaining data in the chunk of spool data.

If the spool file contains printer ready data, each chunk of spool data is written directly to the printer port associated with the targeted printer. All of the chunk of spool data is consumed by the write to the printer port. The sheet assembly, if not already performed by the printer driver, must be deferred to the printer firmware, where the printer-ready data has pre-pended sheet assembly instructions that are understood by the printer firmware.

Figure 8:
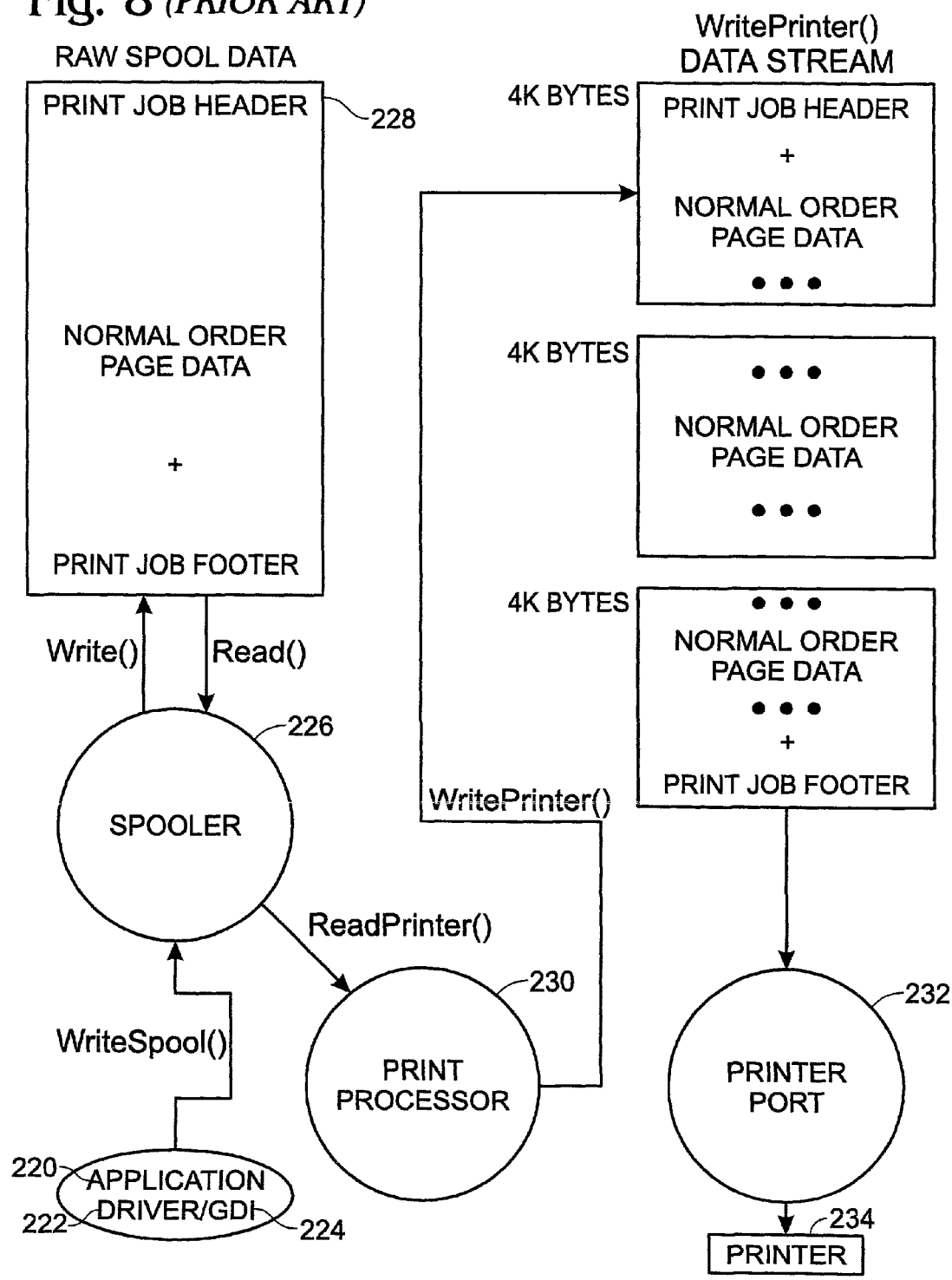
FIG. 8 is a diagram a raw mode printing process.

When a file is printed in a rendered (RAW mode in Microsoft systems) mode format, as shown in FIG. 8, an application 220 working with the system GDI 224 and printer driver 222 creates a print job and sends that job on to the spooler 226. Spooler 226 creates a spool file 228 comprising raw spool data. This data may be stored, for example, in Printer Job Language (PJL), Printer Control Language (PCL) or Portable Document Format (PDF). At actual printing time, the print processor 230 writes the spool file 228 to the printer port 232 where it is directed to a printer 234. Because the data is already in a rendered format in the spool file, it does not need to be processed again by the GDI 224 or driver 222.

In embodiments of the present invention the print processor or similar print system component enables the system to perform cluster printing and load balancing among cluster printing devices. While the term print processor is commonly used to reference a print system component or set of components in a Microsoft Windows operating system, the term may refer to equivalent components in other operating systems.

The print processor may determine the characteristics of a print job including, but not limited to, B&W/Color, Simplex/Duplex, collation, print quality and stapling or hole punching parameters. Once these job requirements are obtained, a print processor may exclude (i.e., drop) from the user or pre-selected cluster, any printers that are unable to meet the sheet assembly and inking characteristics required for the job and/or include alternate printing devices that meet the sheet assembly and inking requirements. These automated processes may be overridden by the user or by other means.

Figure 9:
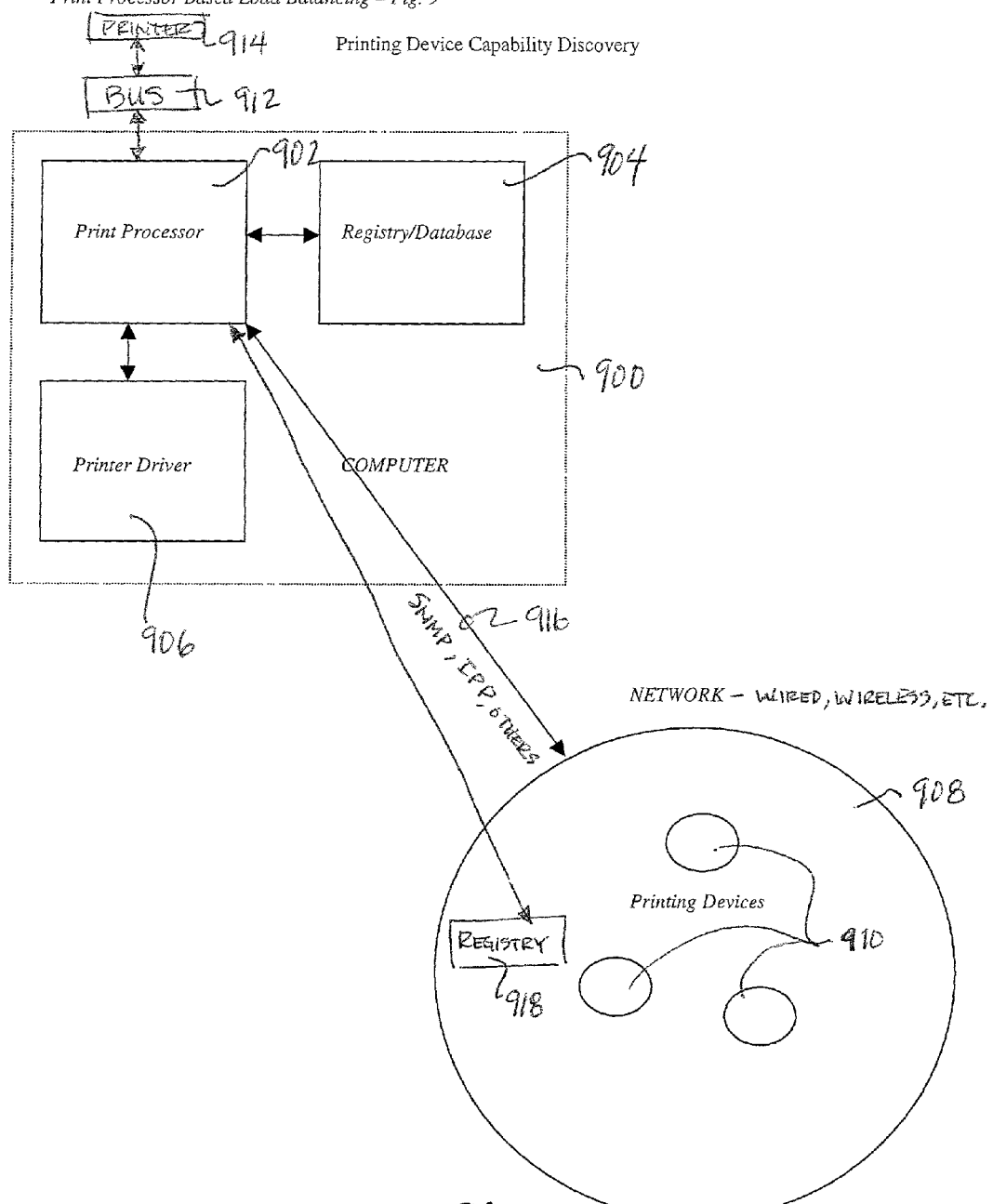
FIG. 9 is a printing device capability discovery process.

A print processor, or printer driver in alternate embodiments, may obtain printing device capability data by a variety of methods. Some of these methods are illustrated in FIG. 9. For example, and not by way of limitation, a print processor 902 may query a printer 914 by bus 912 when a printer is local. A print processor 902 may also query for networked printer capability data over a cable network 908 using such protocols 916 as SNMP or IPP or a wireless network using appropriate wireless protocols. A network query 916 may request pertinent printer capability information from the printer which may be returned in a response. A print processor 902 may also obtain this information from the respective printer driver 906 (e.g., GetPrintero API in Microsoft Windows). Additionally, in some embodiments, a printer database or registry 904 may be used to store printer capability data. A database or registry 904 may be stored locally 904 or at a remote location on a network 918. In other embodiments, printer capability data may be entered by a user or administrator.

Once the print processor, or similar print system component, has obtained the capability data for printers with which it may communicate, the print processor, printer driver or similar component may examine a printer's capabilities and compare them to the characteristics of the current job. As a non-limiting example, the B&W/Color, Simplex/Duplex, collation, print quality, stapling or hole-punching capabilities may be compared to the requirements of the print job. The print processor or other component may additionally examine each printer's disk storage capacity and determines which printers have insufficient space for current job despooling and rendering. For these printers with insufficient disk space, a latency factor, due to the I/O block on the printer port, may be calculated into the PPM.

Print processors or other components of embodiments of the present invention may also examine each printer's rasterization pipeline and determine an optional preRip factor to be used in calculating the PPM for those printers that can, optionally, take rasterized input. For these printers, if the preRip factor increases the PPM and the resources are sufficient on the computer despooling the printer ready data to not otherwise impact the performance of the printing, the print processor will rasterize the PDL data (RIP) instead of the printer's PDL firmware interpreter.

Using these and other factors, a print processor or similar component may calculate a speed or PPM per printer for a specific print job's characteristics. The printers may be ordered according to this PPM, from fastest to slowest.

A print processor or similar component may also take into account other factors such as the availability of the printer. A printer's availability may be, for example, offline, busy or ready.

In some cases, the PPM of a printer may be undeterminable. A system could be presented with any one of three situations. In an "all" situation, all printers have a known PPM. In a "none" situation, all printers have an unknown PPM. In a "mix" situation, some printers have a known PPM and other printers have an unknown PPM. "None" and "mixed" situations have special cases. In these cases, where at least one printer has an unknown PPM, the PPM of the printer may be estimated. A printer's PPM may be estimated in several ways. The following non-limiting methods are exemplary of how the PPM may be estimated:

"None."—All printers have unknown PPM
  i. Normalize
  Treat all printers as homogeneous with a normalized PPM of 1.
"Mixed"
  i. Average
  Take the average PPM of the known printers and assign it to the unknown printers.
  ii. Mean
  Take the mean PPM of the known printers and assign it to the unknown printers.
  iii. Lowest
  Take the lowest PPM of the known printers and assign it to the unknown printers.

In some alternative embodiments, printers with unknown PPM could also be dropped from the cluster.

The despooling of a print job to printing devices can take four primary routes depending on whether the spool data is preprocessed, printer-ready data or journalled data, and whether the print job itself is split (job splitting) or copies of the job are distributed among cluster printers (copy splitting). Alternate routes may also be taken when copy splitting and job splitting are combined.

Load-Balanced Cluster Printing with Journaled Spool Data—Copy Splitting

Figure 10:
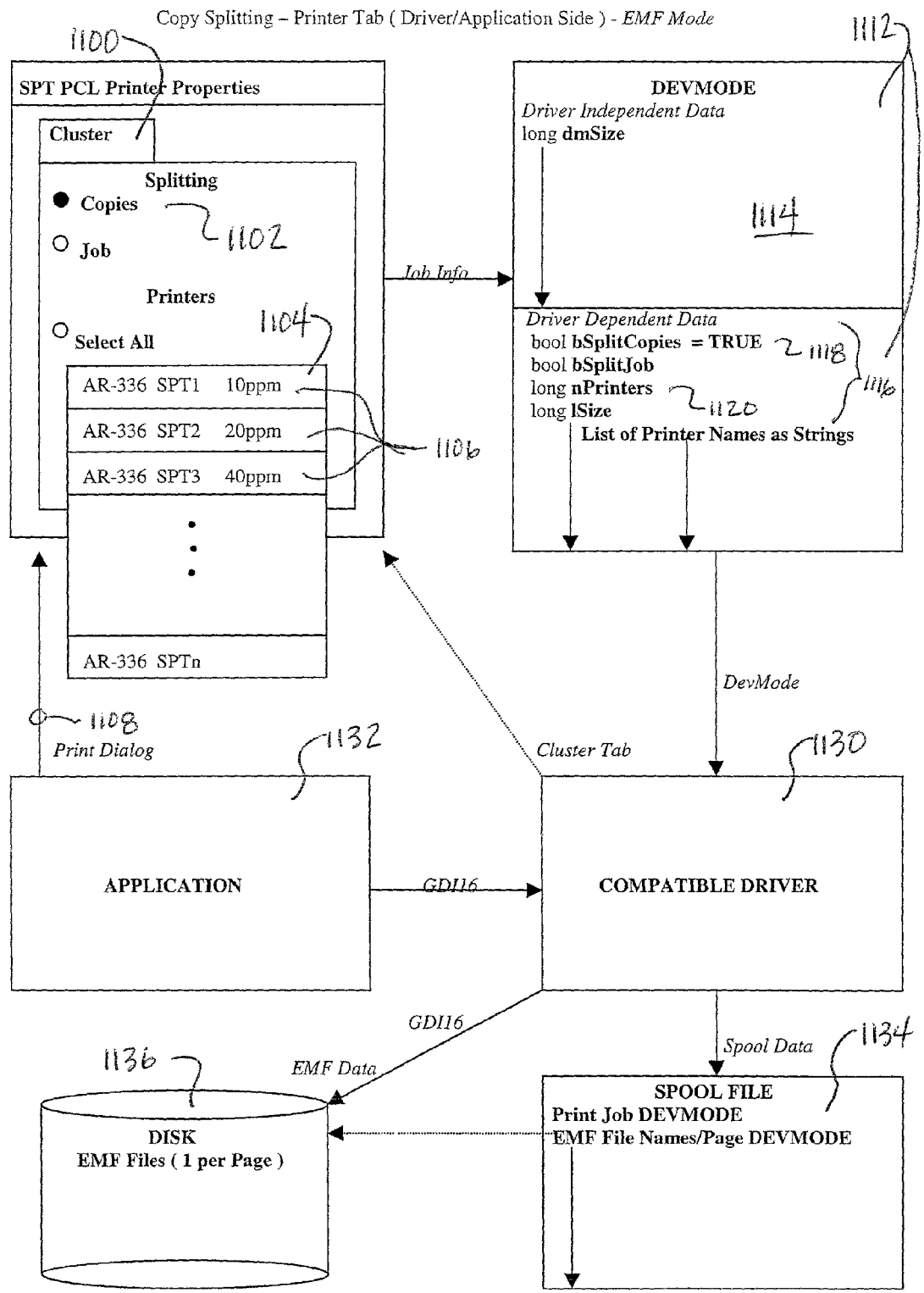
FIG. 10 is a diagram depicting an EMF mode, copy-splitting process of an embodiment of the present invention.
Figure 11:
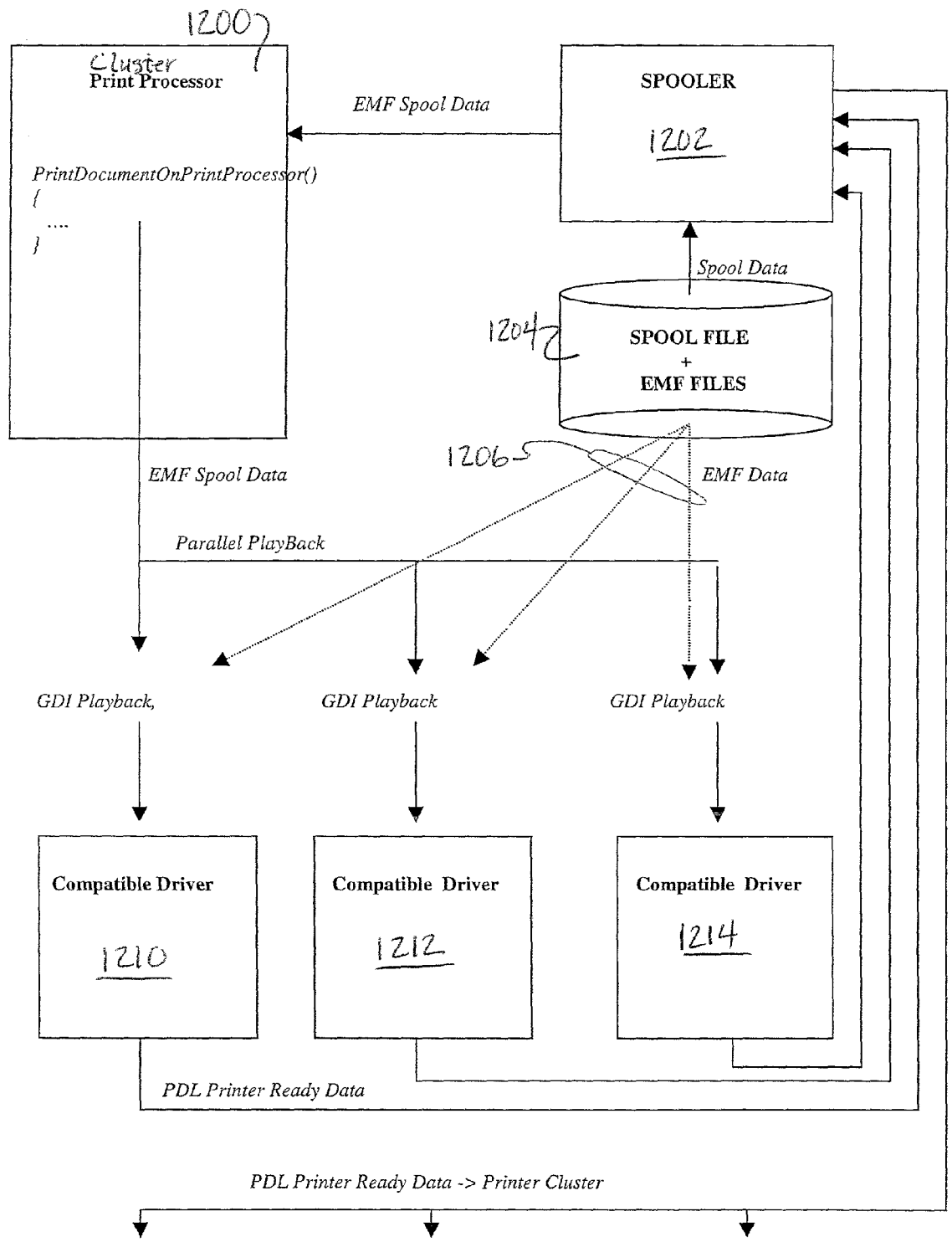
FIG. 11 is a diagram depicting additional elements of the EMF mode, copy-splitting process of FIG. 10.

When a user chooses to print a document using a journaled file format and the user has selected a copy splitting option, the printing process of embodiments of the present invention may be described with reference to FIGS. 10 & 11. Typically, a user initiates a print job by selecting a print option from a print menu or print button 1108 typically found in an application 1132 displayed on a computing device display. In response to this action, a user may be presented with a cluster printing dialog 1100 to allow selection of cluster printing options. A user may select copy-splitting 1102, as in this example. A user may also select from a list of printers 1104 that may be available to the user's computing device. A cluster printing dialog 1100 may comprise a list of printers 1104 that may comprise a display of printer attributes and capabilities such as printer speed or PPM 1106. Once cluster printing options are made, the system proceeds with the print job.

In a Windows environment, the print system follows the normal steps as outlined above, however cluster printing data is combined with general printing data. Devmode data 1112 is generated which comprises driver independent data 1114 and driver dependent data 1116. Driver dependent data 1116 comprises cluster printing options selection data such as copy splitting data 1118, printer selection data 1120 and other cluster printing data. In other embodiments, other forms of device environment and initialization data may comprise cluster printing options selection data.

Devmode data or equivalent data is then passed to the printing device driver 1130 which, in conjunction with a Graphical Device Interface (GDI), creates a spool file 1134 and one or more EMF files 1136. Print job control is then passed to the spooler 1202, which then de-spools the print job to the print processor 1200 for playback.

The print processor 1200 de-spools a journalled (i.e., EMF) print job by playing back the recorded rendering instructions 1204, comprising spool files 1134 and journalled files 1136 such as EMF files, to the printing device's corresponding printer driver(s) 1210, 1212 & 1214. In a case where a user selects a copy splitting option wherein multiple copies of the print job are to be printed to more than one printing device, a print processor may also perform cluster printing functions. For example, a print processor 1200 may distribute the number of copies to be printed across the number of selected printing devices according to the ratio of each printer's PPM to the aggregate PPM of all the selected printers (% percentage of load). When the distribution is not even, the remaining copies may be distributed among the printers as needed. This distribution may be accomplished by parallel playback 1206 of identical spool data to each instance of a printing device's printer driver 1210, 1212 & 1214. As this is performed, the number of copies setting, passed to each instance of the printer driver, is reset to the number distributed to that specific instance of the printing device. During playback, the print driver 1210, 1212 &1214 will produce printer ready data which is then passed to a spooler 1202 for despooling to the specific printers 1216 associated with the printer driver instances 1210, 1212 & 1214.

Figure 12:
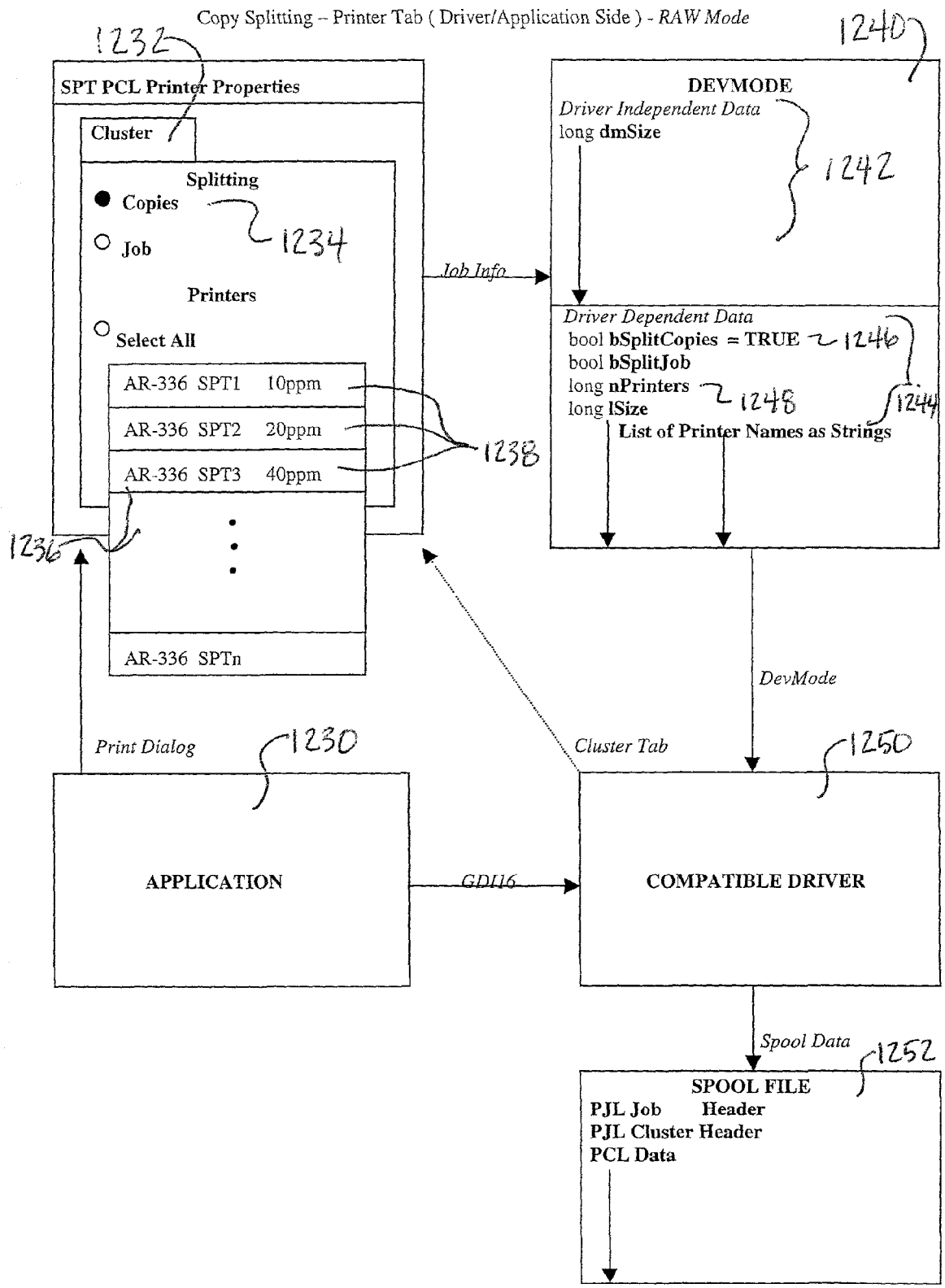
FIG. 12 is a diagram depicting a RAW mode, copy-splitting process of an embodiment of the present invention.

Load-Balanced Cluster Printing with Preprocessed, Printer-Ready Spool Data—Copy Splitting Embodiments of the present invention may also perform copy-splitting cluster printing functions using RAW mode printing. Some of these embodiments may be described with reference to FIGS. 12 & 13.

Typically, a user initiates a print job from an application 1230 by selecting a print option from a print menu or print button within the application 1230. In response to this action, a user may be presented with a cluster printing dialog 1232 to allow selection of cluster printing options. A user may select copy splitting 1234, as in this example. A user may also select from a list of printers 1236 that may be available to the user's computing device. A cluster printing dialog 1232 may comprise a list of printers 1236 that may comprise a display of printer attributes and capabilities such as printer speed or PPM 1238. Once cluster printing options are made, the system proceeds with the print job.

In a Windows environment, the print system follows the normal steps as outlined above, however cluster printing data is combined with general printing data. Devmode data 1240 is generated which comprises driver independent data 1242 and driver dependent data 1244. Driver dependent data 1244 comprises cluster printing options selection data such as copy splitting data 1246, printer selection data 1248 and other cluster printing data. In other embodiments, other forms of device environment and initialization data may comprise cluster printing options selection data. Devmode data 1240 or equivalent data is then passed to the printing device driver 1250 that, in conjunction with a Graphical Device Interface (GDI), creates a spool file 1252 that comprises printer-ready data. Print job control is then passed to the spooler 1262, which de-spools the print job to the print processor 1260 for playback.

A print processor 1260, as shown in FIG. 13, may de-spool pre-processed, printer-ready (i.e., RAW) data by writing the printer-ready data to a port connected to (local), or associated with (network), a corresponding printing device. In a case where a user selects multiple copies of a print job to be printed to multiple printing devices, a print processor of embodiments of the present inventions may perform cluster printing and load-balancing functions. For example, a print processor 1260 may distribute the number of copies to be printed across the number of selected printing devices according to the ratio of each printer's PPM to the aggregate PPM of all the selected printers (% percentage of load). When the distribution is not even, the remaining copies may be distributed among the printers as needed. The print processor may accomplish this distribution by writing 1264 identical spool data 1252 to the selected printing devices' ports 1266 in parallel. In some embodiments a spooler 1262 may be used to spool the data to the ports. As the total number of jobs sent to each printer will vary from the original total requested by the user, the number of copies setting, passed to each of the selected printing devices, is reset to the number distributed to that specific selected printing device.

Load-Balanced Cluster Printing with Journaled Spool Data—Job Splitting

Figure 14:
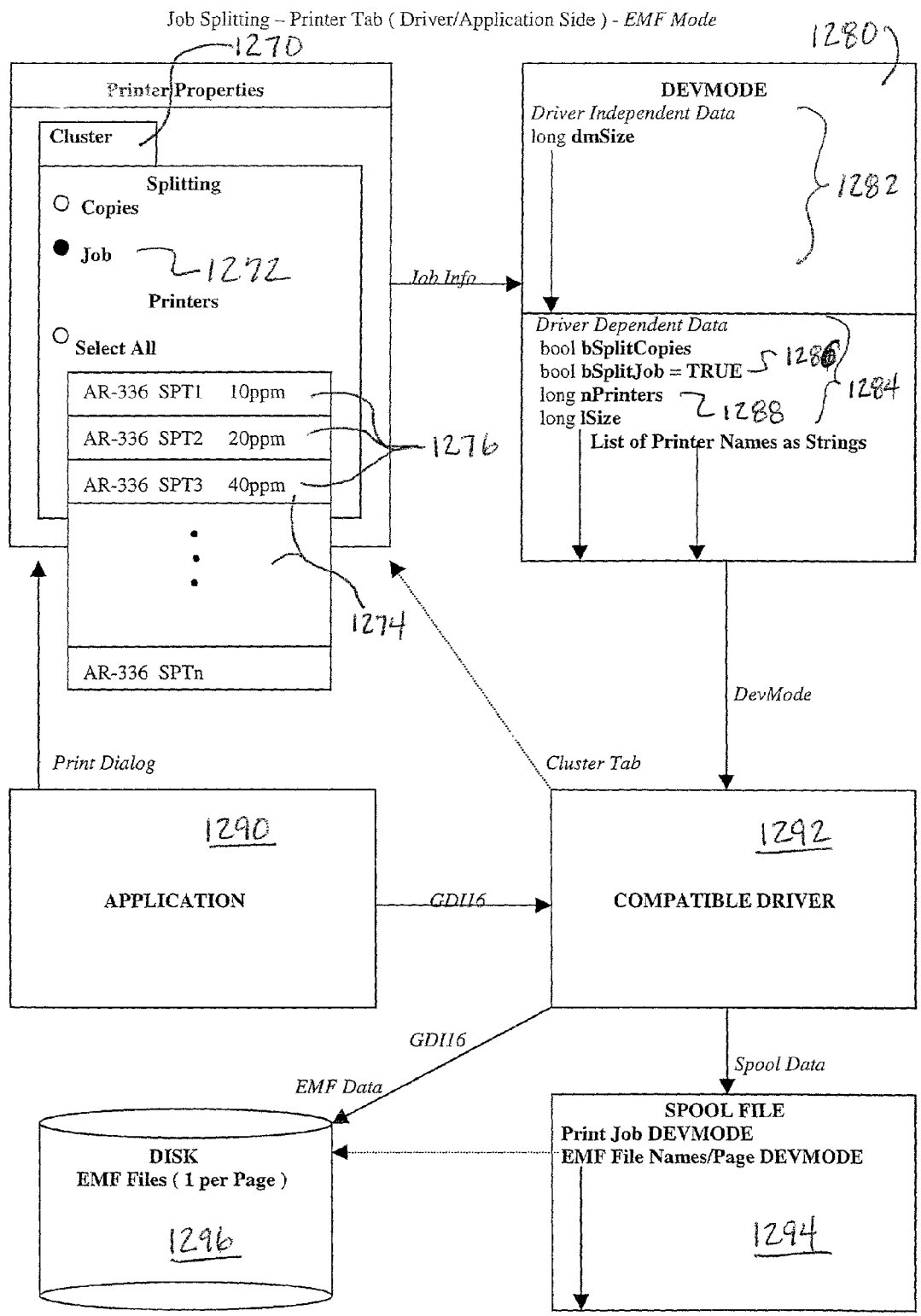
FIG. 14 is a diagram depicting an EMF mode, job-splitting process of an embodiment of the present invention.
Figure 15:
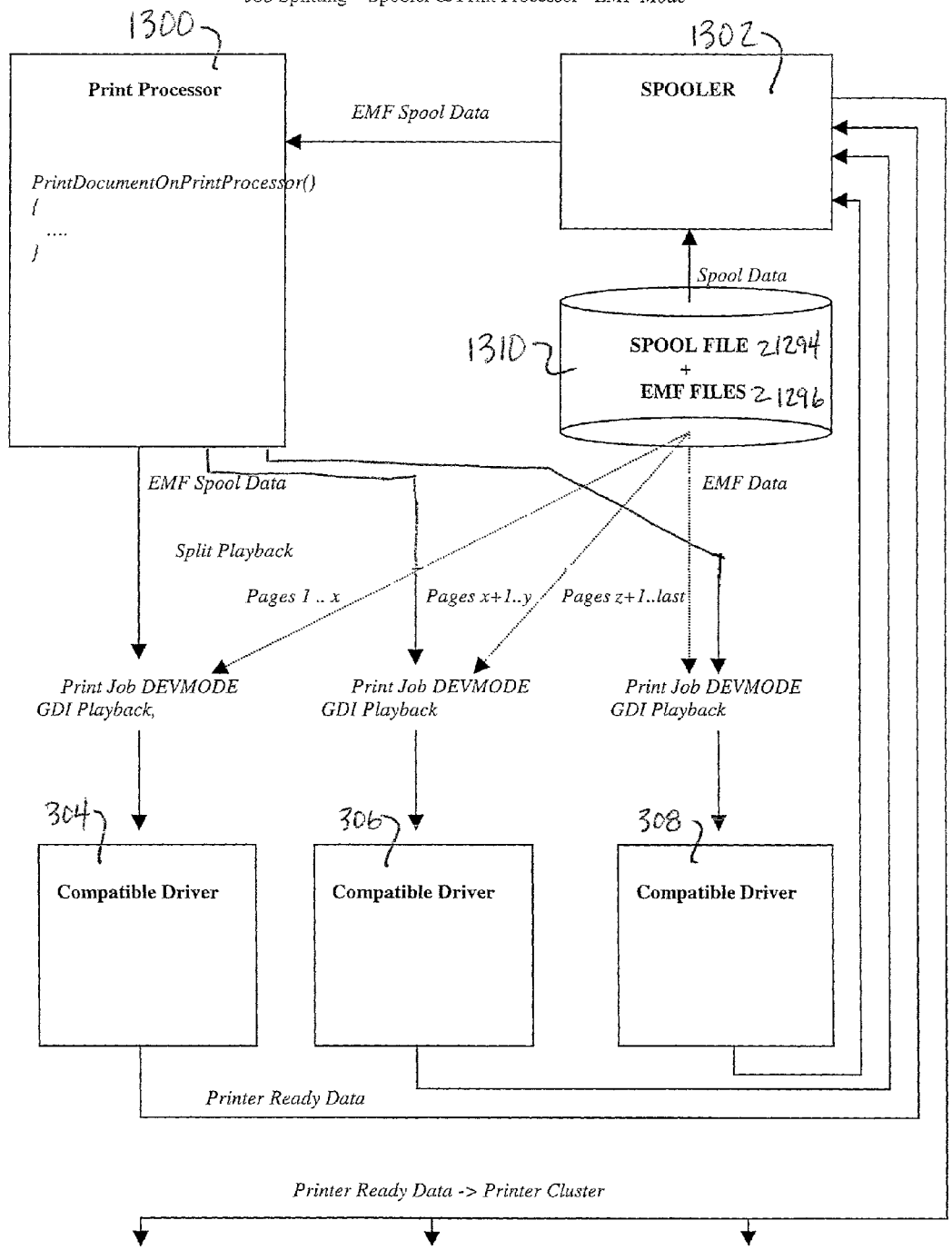
FIG. 15 is a diagram depicting additional elements of the EMF mode, job-splitting process of FIG. 14.

When a user chooses to print a document using a journaled (i.e., EMF) file format and the user has selected a job splitting option, the printing process of embodiments of the present invention may be described with reference to FIGS. 14 & 15. Typically, a user initiates a print job by selecting a print option from a print menu or print button on a computing device display. In response to this action, a user may be presented with a cluster printing dialog 1270 to allow selection of cluster printing options. A user may select job splitting 1272, as in this example. A user may also select from a list of printers 1274 that may be available to the user's computing device. A cluster printing dialog 1270 may comprise a list of printers 1274 that may comprise a display of printer attributes and capabilities such as printer speed or PPM 1276. Once cluster printing options are made, the system proceeds with the print job.

In a Windows environment, the print system follows the normal steps as outlined above, however cluster printing data is combined with general printing data. Devmode data 1280 is generated which comprises driver independent data 1282 and driver dependent data 1284. Driver dependent data 1284 comprises cluster printing options selection data such as job splitting data 1286, printer selection data 1288 and other cluster printing data. In other embodiments, other forms of device environment and initialization data may comprise cluster printing options selection data.

Devmode data or equivalent data is then passed to the printing device driver 1292 which, in conjunction with a Graphical Device Interface (GDI), creates a spool file 1294 and one or more EMF files 1296. Print job control is then passed to the spooler 1302, which then de-spools the print job to the print processor 1300 for playback.

The print processor 1300 de-spools a journalled (i.e., EMF) print job by playing back the recorded rendering instructions 1310, comprising spool files 1294 and journalled files 1296 such as EMF files, to the printing device's corresponding printer driver(s) 1304, 1306 & 1308. In a case where a user selects a job splitting option wherein a print job is split into sections and each section is distributed among multiple printers in a cluster, a print processor may also perform these and other cluster printing functions. For example, a print processor 1300 may distribute the total number of sheets in a print job across the selected printing devices. This may be done according to the ratio of each printer's PPM to the aggregate PPM of all selected printers in the cluster (i.e., % percentage of load). If the distribution is not even, the remaining sheets may be distributed according to printer speed or some other distribution scheme. Once a print job has been split into sections for distribution to individual printers, playback may commence. Each print job section may be played-back to the drivers 1304, 1306 & 1308 associated with the individual printers 1312. Each print job section may comprise common print job controls and preparations common to all sheets (e.g. DEVMODE) along with a preamble sheet control and preparations for the next sheet in the consecutive sequential order, assigned to the corresponding printing device. Print job sections may also comprise page control and preparations for each logical page placed on the sheet when a print format assigns multiple logical pages to a single printed sheet. Logical page data is typically followed by the journaled rendering instructions for the corresponding page.

In other embodiments of the present invention, print jobs may be split based on color separation, dpi, complexity and/or other factors. These embodiments may use PPM values that are known or estimated for these characteristics.

Figure 16:
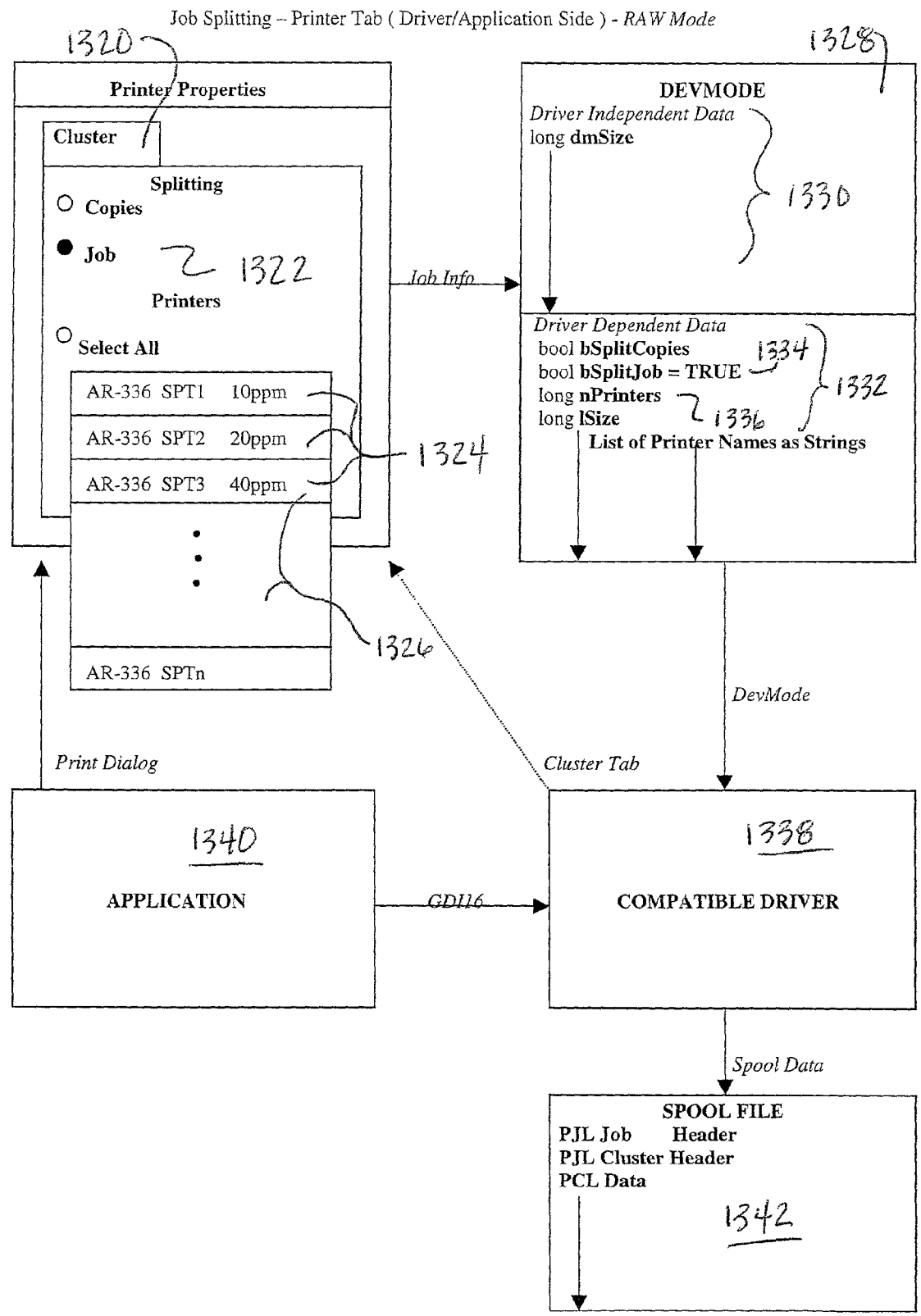
FIG. 16 is a diagram depicting a RAW mode, job-splitting process of an embodiment of the present invention.

Load-Balanced Cluster Printing with Preprocessed, Printer-Ready Spool Data—Job Splitting Embodiments of the present invention may also perform job splitting cluster printing functions using RAW mode printing. Some of these embodiments may be described with reference to FIGS. 16 & 17.

Typically, a user initiates a print job from an application 1340 by selecting a print option from a print menu or print button within the application 1340. In response to this action, a user may be presented with a cluster printing dialog 1320 to allow selection of cluster printing options. A user may select job splitting 1322, as in this example. A user may also select from a list of printers 1326 that may be available to the user's computing device. A cluster printing dialog 1320 may comprise a list of printers 1326 that may comprise a display of printer attributes and capabilities such as printer speed or PPM 1324. Once cluster printing options are made, the system proceeds with the print job.

In a Windows environment, the print system follows the normal steps as outlined above, however cluster printing data is combined with general printing data. Devmode data 1328 is generated which comprises driver independent data 1330 and driver dependent data 1332. Driver dependent data 1332 comprises cluster printing options selection data such as job splitting data 1334, printer selection data 1336 and other cluster printing data. In other embodiments, other forms of device environment and initialization data may comprise cluster printing options selection data.

Devmode data 1328 or equivalent data is then passed to the printing device driver 1338 that, in conjunction with a Graphical Device Interface (GDI), creates a spool file 1342 that comprises printer-ready data. Print job control is then passed to the spooler 1346, which then de-spools the print job to the print processor 1344 for playback.

A print processor 1344, as shown in FIG. 17, may de-spool pre-processed, printer-ready (i.e., RAW) data by writing the printer-ready data to a port connected to (local), or associated with (network), a corresponding printing device. In a case where a user selects job splitting options, a print processor of embodiments of the present inventions may perform cluster printing and load-balancing functions. For example, a print processor 1344 may distribute the total number of sheets in a print job across the selected printing devices. This may be done according to the ratio of each printer's PPM to the aggregate PPM of all selected printers in the cluster (i.e., % percentage of load). If the distribution is not even, the remaining sheets may be distributed according to printer speed or some other distribution scheme. Once a print job has been split into sections for distribution to individual printers, playback may commence.

Print job sections, in printer-ready form (i.e., RAW), may be played directly to the printer ports 1350, 1352 & 1354 associated with the printers selected for the cluster print job.

Each print job section may comprise common print job controls and preparations common to all sheets (e.g. DEVMODE) along with a preamble sheet control and preparations for the next sheet in the consecutive sequential order, assigned to the corresponding printing device. Print job sections may also comprise page control and preparations for each logical page placed on the sheet when a print format assigns multiple logical pages to a single printed sheet.

Small Loads and Special Cases

If the number of selected printers is less than the number of copies or pages to be balanced across the cluster, the load may be alternately distributed by best fit or by other methods. An example is to order the printers by PPM speed and distribute the load from fastest to slowest.

Another example is to take into account warm up cycles, where a preference is given to a printer that just finished a job (warm) over a printer that is idle (cool).

Some embodiments of the present invention used in conjunction with Windows NT/2000 systems may "fool" the system into processing a print job locally to enable some features of these embodiments. One method in which this may be done is by assigning a network device to a client parallel port, LPT1. This method makes the operating system believe it is printing to a local printer when output is actually redirected to a network device.

Some embodiments of the present invention comprise functionality that operates in conjunction with or as a part of a server's print processor.

Other embodiments of the present invention may be used in conjunction with or as a part of the spooling and despooling subsystems of the Apple Macintosh Operating System, Linux Operating System, System V Unix Operating Systems, BSD Unix Operating Systems, OSF Unix Operating Systems, and IBM Mainframe MVS Operating System, as well as other operating systems.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for distributing a print task among a plurality of printing devices, said method comprising:
   receiving a print task at a print system component on a computing device;
   receiving user input comprising a cluster printing selection at said print system component, wherein said selection identifies specific printing devices and communicates a specific quantity of printing devices;
   combining said print task with said cluster printing selection using said print system component on said computing device thereby creating driver-dependent data;
   transmitting said driver-dependent data to a printer driver;
   creating spool data from said driver-dependent data, using said printer driver, wherein said spool data consists of a print task ticket specifying capability requirements of the print task and the driver-dependent data, and wherein said spool data is compatible as input to specific printer drivers corresponding to each of said specific printing devices;
   determining, with said print system component on said computing device, portions of said spool data to be distributed to each of said specific printing devices;
   analyzing rasterization pipelines of said specific printing devices to determine a preRip factor for said specific printing devices accepting rasterized input;
   if said preRip factor indicates that rasterization of a specific portion of said spool data with said computing device will increase the output capacity of at least one of said specific printing devices, rasterizing said specific portion of said spool data with said print system component;

analyzing storage capacities of said specific printing devices to determine current storage capacities for job despooling and rendering;

determining, with said print system component on said computing device, the output capacity of said specific printing devices wherein said determining comprises accounting for said preRip factor and said current storage capacities;

when the output capacity of at least one of said specific printing devices cannot be determined, estimating an estimated output capacity of said at least one specific printing device based on the determined output capacities of at least one other of said specific printing devices;

despooling said spool data in accordance with said cluster printing selection wherein said despooling comprises distribution of said print task to said specific printing devices in substantial proportion to each of said specific printing device's output capacity or estimated output capacity, wherein said distribution results in creation of distributed spool data portions and wherein said despooling further comprises concurrent parallel playback of said spool data portions to said specific printer drivers corresponding to each of said specific printing devices, wherein each of said specific printer drivers converts said distributed spool data portions into device-dependent data portions compatible with said corresponding specific printing devices and each of said specific printer drivers spools said device-dependent data portions to said print system component; and despooling, with said print system component, said device-dependent data portions to said specific printing devices, wherein said despooling with said print system component is performed in parallel.

2. The method of claim 1 wherein said determining the output capacity comprises querying a local printer through a system bus.

3. The method of claim 1 wherein said determining the output capacity comprises querying a network printer using a network communications protocol.

4. The method of claim 1 wherein said determining the output capacity comprises querying a printer driver.

5. The method of claim 1 wherein said determining the output capacity comprises accessing a printer attribute registry.

6. The method of claim 1 wherein said print system component comprises a print processor.

7. The method of claim 1 wherein said determining the output capacity comprises estimating the capability of some of said multiple printing devices.

8. A method for distributing a print task among a plurality of printing devices, said method comprising:

receiving a print task at a print system component, which resides on a computing device from which said print task originates;

receiving user input comprising a cluster printing selection at said print system component, wherein said selection identifies specific printing devices and communicates a specific quantity of printing devices;

combining said print task with said cluster printing selection using said print system component on said computing device, thereby creating driver-dependent data;

transmitting said driver-dependent data to a printer driver, wherein said printer driver resides on said computing device;

creating spool data from said driver-dependent data, using said printer driver, wherein said spool data consists of a print task ticket specifying capability requirements of the print task and the driver-dependent data, and wherein said spool data is compatible as input to specific printer drivers corresponding to each of said specific printing devices;

modifying said spool data according to said cluster printing selection, with said print system component on said computing device;

analyzing rasterization pipelines of said specific printing devices to determine a preRip factor for said specific printing devices accepting rasterized input;

if said preRip factor indicates that rasterization of a specific portion of said spool data with said computing device will increase the output capacity of at least one of said specific printing devices, rasterizing said specific portion of said spool data with said print system component;

analyzing storage capacities of said specific printing devices to determine current storage capacities for job despooling and renderings;

determining the output capacity of multiple printing devices comprising said specific printing devices, with said print system component on said computing device, wherein said determining comprises accounting for said preRip factor and said current storage capacities;

when the output capacity of at least one of said specific printing devices cannot be determined, estimating an estimated output capacity of said at least one specific printing device based on the determined output capacities of at least one other of said specific printing devices;

despooling said spool data in accordance with said cluster printing selection wherein said despooling comprises distribution of said print task to said specific printing devices in substantial proportion to each of said specific printing device's output capacity or estimated output capacity, wherein said distribution results in creation of distributed spool data portions and wherein said despooling further comprises concurrent parallel playback of said spool data portions to said specific printer drivers corresponding to each of said specific printing devices, wherein each of said specific printer drivers converts said distributed spool data portions into device-dependent data portions compatible with said corresponding specific printing devices and each of said specific printer drivers spools said device-dependent data portions to said print system component; and despooling, with said print system component, said device-dependent data portions to said specific printing devices, wherein said despooling with said print system component is performed in parallel.

9. The method of claim 8 wherein said output capacity comprises a printer's speed in PPM.

10. The method of claim 8 wherein a determination of said output capacity comprises an analysis of a printing device's rasterization pipeline.

11. The method of claim 8 wherein a determination of said output capacity comprises an evaluation of alternative rasterization methods and a selection of the fastest method for a specific print task.

12. A printing system for distributing a print task among a plurality of printing devices, said system comprising:

a single computing device comprising the following elements;

an application for generating a print task;

a print task receiver for receiving said print task;

a cluster selection receiver for receiving a cluster printing selection comprising an identification of specific printing devices and a quantity of specific printing devices;

a combiner for combining said print task with said cluster printing selection thereby creating driver-dependent data;

a transmitter for transmitting said driver-dependent data to a printer driver;

a driver for creating spool data from said driver-dependent data, wherein said spool data consists of a print task ticket specifying capability requirements of the print task and the driver-dependent data, and wherein said spool data is compatible as input to specific printer drivers corresponding to each of said specific printing devices;

a modifier for modifying said spool data according to said cluster printing selection;

an analyzer for analyzing rasterization pipelines of said specific printing devices to determine a preRip factor for said specific printing devices accepting rasterized input;

a rasterizer for rasterizing said specific portion of said spool data with said print system component if said preRip factor indicates that rasterization of a specific portion of said spool data with said computing device will increase the output capacity of at least one of said specific printing devices;

an analyzer for analyzing storage capacities of said specific printing devices to determine current storage capacities for job despooling and renderings;

a capacity determiner for determining the output capacity of multiple printing devices comprising said specific printing devices, wherein said output capacity accounts for said preRip factor and said current storage capacities;

an estimator for estimating an estimated output capacity of said at least one specific printing device based on the determined output capacities of at least one other of said specific printing devices, when the output capacity of at least one of said specific printing devices cannot be determined;

a portioner for determining portions of said spool data to be distributed to each of said specific printing devices; and a despooler for despooling said spool data portions in accordance with said cluster printing selection wherein said despooling comprises distribution of said spool data portions to said specific printing devices in substantial proportion to each of said specific printing device's output capacity or estimated output capacity, wherein said distribution results in creation of distributed spool data portions and wherein said despooling further comprises concurrent parallel playback of said spool data portions to said specific printer drivers, wherein each of said specific printer drivers converts said distributed spool data portions into device-dependent data portions compatible with said corresponding specific printing devices and each of said specific printer drivers spools said device-dependent data portions to said print system component; and wherein said print system component despools, said device-dependent data portions to said specific printing devices, wherein said despooling with said print system component is performed in parallel.

13. A non-transitory computer-readable medium comprising instructions for distributing a print task among a plurality of printing devices, said instructions comprising the acts of:

receiving a print task at a print system component, which resides on a computing device from which said print task originates;

receiving user input comprising a cluster printing selection at said print system component, wherein said selection identifies specific printing devices and a quantity of specific printing devices;

combining said print task with said cluster printing selection using said print system component on said computing device, thereby creating driver-dependent data;

transmitting said driver-dependent data to a printer driver;

creating spool data from said driver-dependent data, using said printer driver, wherein said spool data consists of a print task ticket specifying capability requirements of the print task and the driver-dependent data, and wherein said spool data is compatible as input to specific printer drivers corresponding to each of said specific printing devices;

modifying said spool data according to said cluster printing selection, using said print system component on said computing device;

analyzing rasterization pipelines of said specific printing devices to determine a preRip factor for said specific printing devices accepting rasterized input;

if said preRip factor indicates that rasterization of a specific portion of said spool data with said computing device will increase the output capacity of at least one of said specific printing devices, rasterizing said specific portion of said spool data with said print system component;

analyzing storage capacities of said specific printing devices to determine current storage capacities for job despooling and rendering;

determining the output capacity of multiple printing devices comprising said specific printing devices, using said print system component on said computing device, wherein said determining accounts for said preRip factor and said current storage capacities;

when the output capacity of at least one of said specific printing devices cannot be determined, estimating an estimated output capacity of said at least one specific printing device based on the determined output capacities of at least one other of said specific printing devices;

determining portions of said spool data to be distributed to each of said specific printing devices, using said print system component on said computing device; and despooling said spool data in accordance with said cluster printing selection wherein said despooling comprises distribution of said spool data portions to said specific printing devices in substantial proportion to each of said specific printing device's output capacity or estimated output capacity, wherein said distribution results in creation of distributed spool data portions and wherein said despooling further comprises concurrent parallel playback of said spool data portions to said specific printer drivers, wherein each of said specific printer drivers converts said distributed spool data portions into device-dependent data portions compatible with said corresponding specific printing devices and each of said specific printer drivers spools said device-dependent data portions to said print system component; and wherein said print system component despools, said device-dependent data portions to said specific printing devices, wherein said despooling with said print system component is performed in parallel.

* * * * *